United States Patent
Matthiesen et al.

(10) Patent No.: US 9,472,364 B2
(45) Date of Patent: Oct. 18, 2016

(54) REFLOWABLE CIRCUIT PROTECTION DEVICE

(71) Applicant: Tyco Electronics Corporation, Berwyn, PA (US)

(72) Inventors: Martyn A. Matthiesen, Fremont, CA (US); Anthony Vranicar, Santa Clara, CA (US); Jianhua Chen, Sunnyvale, CA (US); Dapeng Hou, Montgeroult (FR)

(73) Assignee: Littelfuse, Inc., Chicago, IL (US)

( * ) Notice: Subject to any disclaimer, the term of this patent is extended or adjusted under 35 U.S.C. 154(b) by 237 days.

(21) Appl. No.: 14/268,913

(22) Filed: May 2, 2014

(65) Prior Publication Data
US 2015/0318131 A1    Nov. 5, 2015

(51) Int. Cl.
| | |
|---|---|
| *H01H 37/70* | (2006.01) |
| *H01H 37/04* | (2006.01) |
| *H01H 37/36* | (2006.01) |
| *B23K 31/02* | (2006.01) |
| *H01H 37/32* | (2006.01) |
| *H01H 11/00* | (2006.01) |
| *B23K 1/00* | (2006.01) |

(Continued)

(52) U.S. Cl.
CPC ............ *H01H 37/70* (2013.01); *B23K 1/0016* (2013.01); *B23K 31/02* (2013.01); *H01H 11/00* (2013.01); *H01H 37/04* (2013.01); *H01H 37/32* (2013.01); *H01H 37/761* (2013.01); *H01H 37/08* (2013.01); *H01H 2037/046* (2013.01); *H01H 2037/762* (2013.01); *H01H 2229/00* (2013.01); *H01H 2235/01* (2013.01); *H01H 2239/072* (2013.01)

(58) Field of Classification Search
CPC .... H01H 37/70; H01H 37/761; H01H 37/04; H01H 37/32; H01H 11/00; H01H 2037/762; H01H 2235/01; H01H 2239/072; H01H 2229/00; B23K 31/02; B23K 1/0016
USPC ...................... 337/407; 228/203; 29/622, 623
See application file for complete search history.

(56) References Cited

U.S. PATENT DOCUMENTS

| | | | | |
|---|---|---|---|---|
| 4,047,143 A | * | 9/1977 | Burden | ................. H01H 85/36 337/239 |
| 4,486,804 A | * | 12/1984 | Watson | ................ H01H 85/048 337/239 |
| 4,862,134 A | | 8/1989 | Poerschke et al. | |

(Continued)

FOREIGN PATENT DOCUMENTS

DE    102008053182 A1    7/2010

OTHER PUBLICATIONS

Partial International Search Report for International Application No. PCT/US2015/028805, Jul. 29, 2015.

*Primary Examiner* — Anatoly Vortman

(57) ABSTRACT

A circuit protection device includes a base assembly, a spring on top of the base, a conductive terminal that fits over the base and spring, and a cap that first over the base, spring and terminal. The base includes latches on the front side of the base. The conductive terminal includes a first end on the front side of the base and a second end on a rear side of the base that is opposite to the front side. The cap includes a first protrusion extending downward from the cap above one of the latches and a second protrusion extending downward from the cap above the other latch. The circuit protection device also includes a means for activating the circuit protection device after reflow in response to a force applied to the cap in a first direction defined from a top of the cap towards the base.

24 Claims, 34 Drawing Sheets

(51) Int. Cl.
*H01H 37/76* (2006.01)
*H01H 37/08* (2006.01)

(56) References Cited

U.S. PATENT DOCUMENTS

| | | | |
|---|---|---|---|
| 5,612,662 A * | 3/1997 | Drekmeier | H01H 37/761 29/623 |
| 5,831,507 A * | 11/1998 | Kasamatsu | H01H 9/10 337/299 |
| 7,002,785 B1 * | 2/2006 | Bothe | H01H 37/76 361/103 |
| 7,864,024 B2 * | 1/2011 | Schlenker | H01H 37/761 337/239 |
| 8,665,057 B2 * | 3/2014 | Schlenker | H01H 37/761 337/239 |
| 2009/0027156 A1 * | 1/2009 | Schlenker | H01H 37/761 337/404 |
| 2010/0328016 A1 | 12/2010 | Wang | |
| 2014/0232511 A1 * | 8/2014 | Durth | H01H 37/764 337/180 |

* cited by examiner

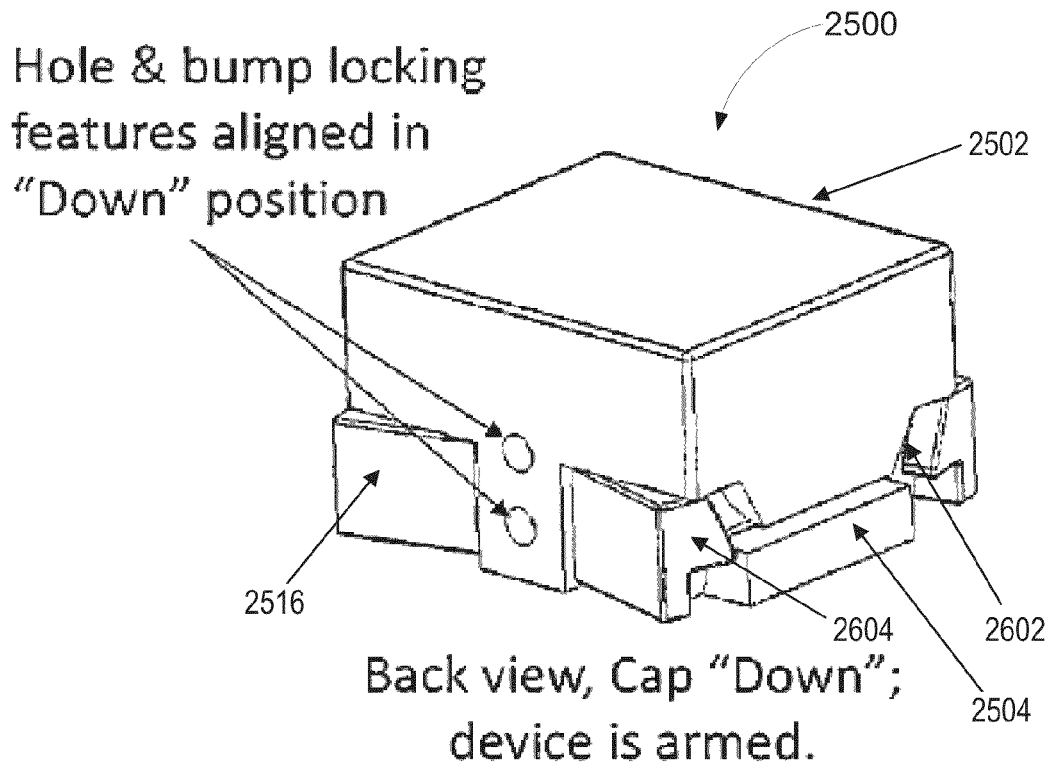
Figure 33 — Back view, Cap "Down"; device is armed. Hole & bump locking features aligned in "Down" position.
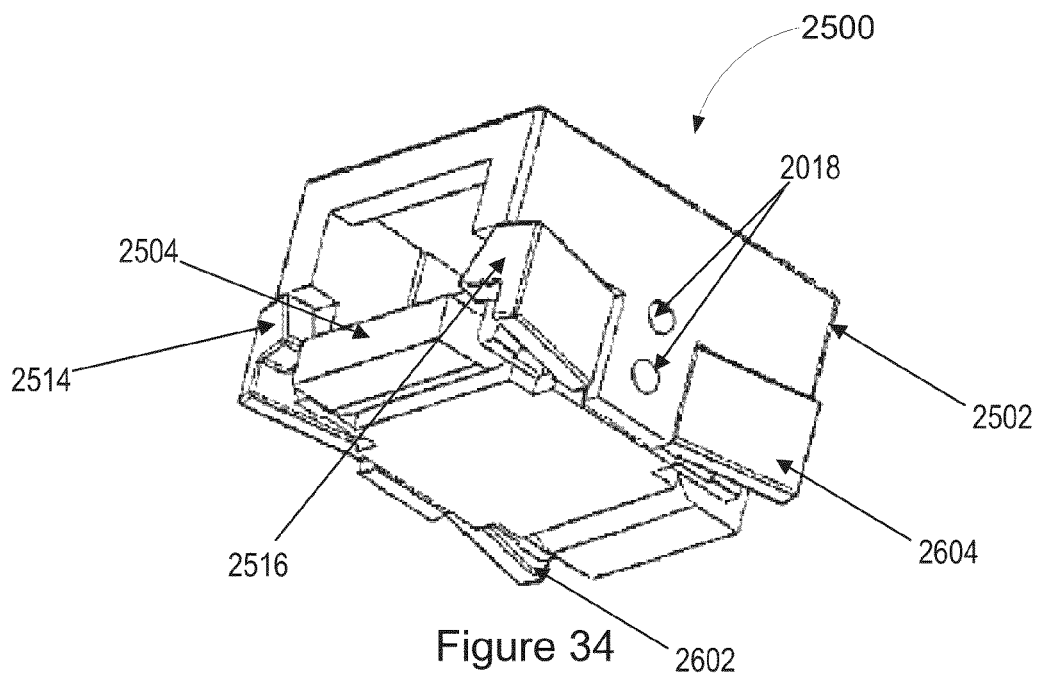
Figure 34

REFLOWABLE CIRCUIT PROTECTION DEVICE

BACKGROUND

1. Field of the Invention

The present invention relates generally to electronic protection circuitry. More, specifically, the present invention relates to a reflowable surface mount circuit protection device.

2. Background of the Invention

Protection circuits are oftentimes utilized in electronic circuits to isolate failed circuits from other circuits. For example, a protection circuit may be utilized to prevent an electrical or thermal fault condition in electrical circuits, such as in lithium-ion battery packs. Protection circuits may also be utilized to guard against more serious problems, such as a fire caused by a power supply circuit failure.

One type of protection circuit is a thermal fuse. A thermal fuse functions similar to a typical glass fuse. That is, under normal operating conditions the fuse behaves like a short circuit and during a fault condition the fuse behaves like an open circuit. Thermal fuses transition between these two modes of operation when the temperature of a thermal fuse exceeds a specified temperature. To facilitate these modes, thermal fuses include a conduction element, such as a fusible wire, a set of metal contacts, or set of soldered metal contacts, that can switch from a conductive to a non-conductive state. A sensing element may also be incorporated. The physical state of the sensing element changes with respect to the temperature of the sensing element. For example, the sensing element may be a low melting-temperature metal alloy or a discrete melting organic compound that melts at an activation temperature. When the sensing element changes state, the conduction element switches from the conductive to the non-conductive state by physically interrupting an electrical conduction path.

In operation, current flows through the fuse element. Once the sensing element reaches the specified temperature, it changes state and the conduction element switches from the conductive to the non-conductive state.

One disadvantage of some existing thermal fuses is that during installation of the thermal fuse, care must be taken to prevent the thermal fuse from reaching the temperature at which the sensing element changes state. As a result, some existing thermal fuses cannot be mounted to a circuit panel via reflow ovens, which operate at temperatures that will cause the sensing element to open prematurely.

Thermal fuses described in U.S. Pat. No. 8,289,122, issued Oct. 16, 2012, and U.S. Pat. No. 8,581,686, issued Nov. 12, 2013—the entirety of each of which are incorporated herein by reference—address the disadvantages described above. While progress has been made in providing improved circuit protection devices, there remains a need for improved circuit protection devices.

SUMMARY

A circuit protection device includes a base assembly, a spring on top of the base, a conductive terminal that fits over the base and spring, and a cap that fits over the base, spring and terminal. The base includes latches on the front side of the base. The conductive terminal includes a first end on the front side of the base and a second end on a rear side of the base that is opposite to the front side. The cap includes a first protrusion extending downward from the cap above one of the latches and a second protrusion extending downward from the cap above the other latch. The circuit protection device also includes a means for activating the circuit protection device after reflow in response to a force applied to the cap in a first direction defined from a top of the cap towards the base.

BRIEF DESCRIPTION OF THE DRAWINGS

FIGS. 32-34 show the circuit protection device shown in FIG. 25 after being armed.

DETAILED DESCRIPTION

Figure 1:
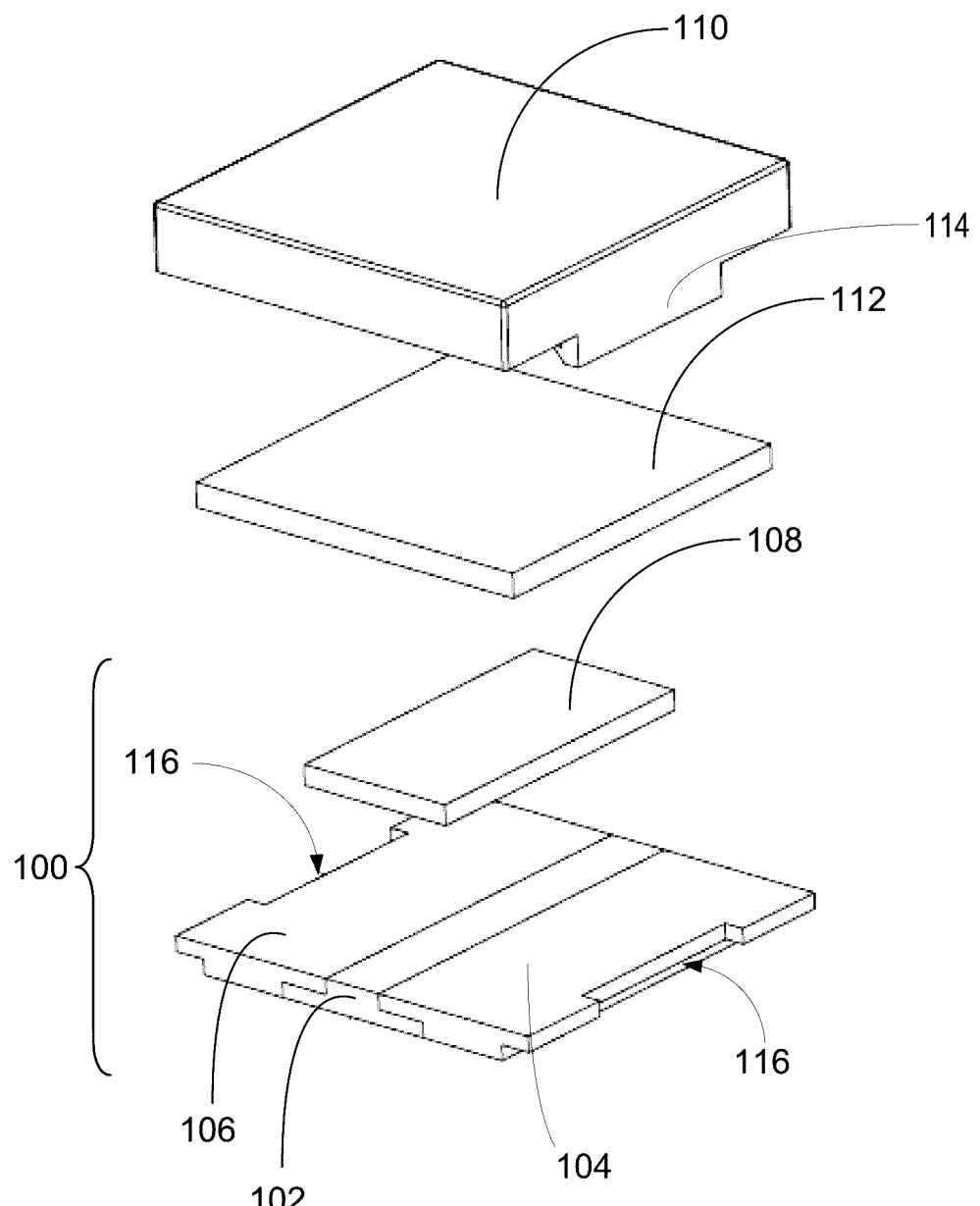
FIGS. 1-2 show exploded views of an example of a reflowable circuit protection device.
Figure 2:
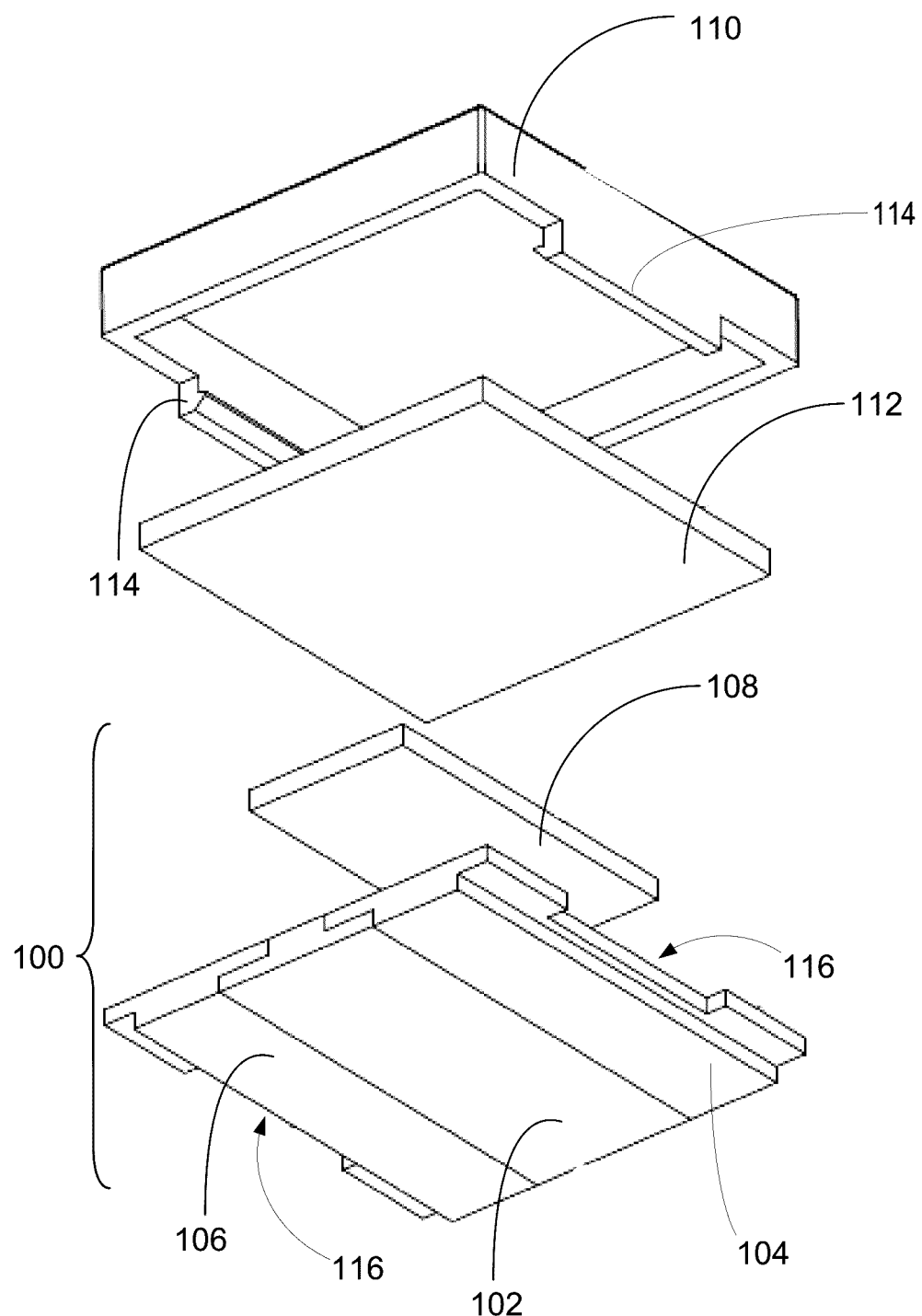

FIGS. 1 and 2 show exploded views of a reflowable circuit protection device. The device includes a base assembly 100, which includes a dielectric 102 formed between two electrodes 104, 106. The device connects to an external circuit through the electrodes 104, 106. At least a portion of the lower surface of each electrode 104, 106 is mounted on a printed circuit board when the device is installed. The width (w) of the portion of the dielectric 102 between the upper surfaces of each of the electrodes 104, 106 may be between about 0.5 mm and about 1.0 mm.

The base assembly 100 also includes a low melting point metal 108, such as a solder link, that is formed above at least a portion of the dielectric 102 and electrodes 104, 106 to form a conductive bridge between the electrodes 104, 106. In one embodiment, the low melting point metal 108 may have a height of about 0.25 mm, a width of about 2.0 mm, and a length of about 5.0 mm or less. The low melting point metal has a melting point that is lower than a reflow temperature, e.g., a low melting point solder with a melting point of approximately 210° C. The temperature during reflow may be for example 260° C. A coating, such as an oxide coating, may be applied on the low melting point metal 108. Where the coating is an oxide coating, application of the coating may include allowing the oxide to form and/or applying heat to accelerate oxidation. The coating prevents the metal 108 from separating when it melts during reflow, as explained in more detail below.

The reflowable surface mount circuit protection device also includes a cap 110, or a cover, with a flux 112 formed inside the cap 110. In one embodiment the cap 110 may be about 5.0 mm by about 5.0 mm. The flux 112 is explained in more detail below. The cap 110 includes protrusions 114 that fit in cutouts 116 defined in the electrodes 104, 16 to form a snap-fit connection between the cap 110 and the base assembly 100.

Figure 3:
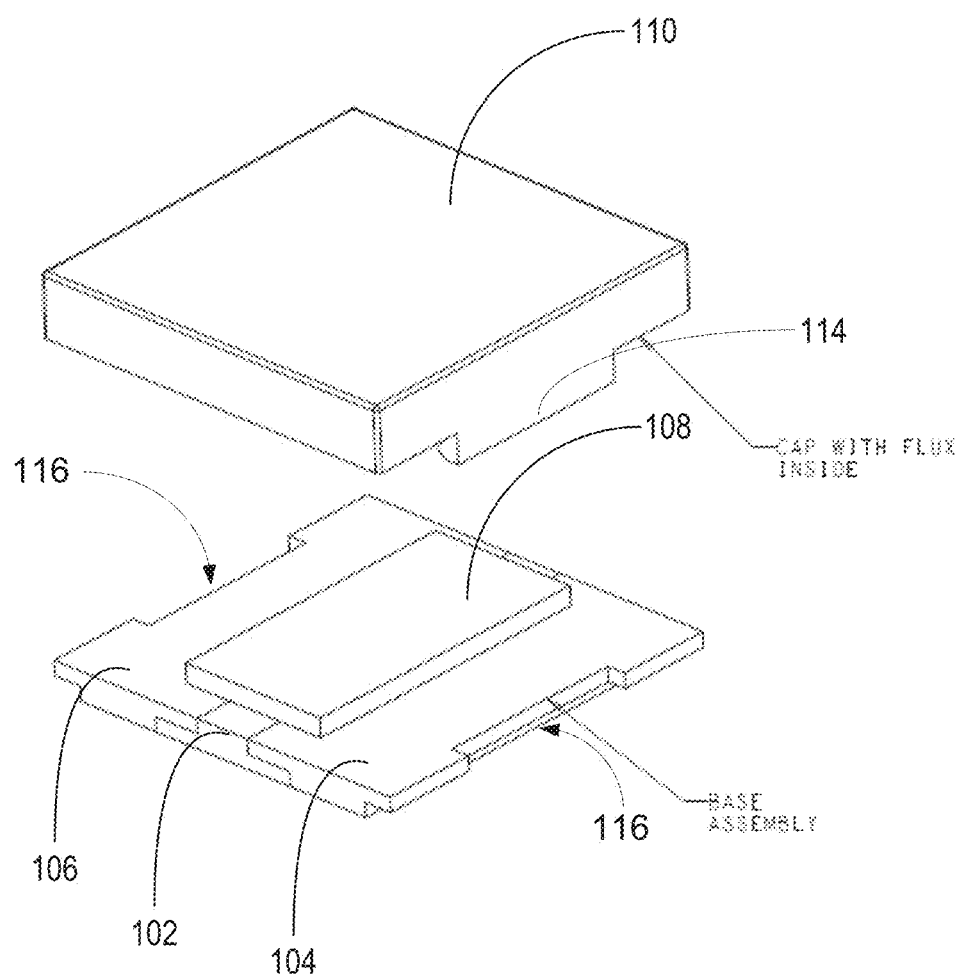
FIG. 3 shows an isomeric view of the circuit protection device shown in FIGS. 1-2, showing the cap prior to installation onto the base assembly.

FIG. 3 shows an isomeric view of the circuit protection device showing the cap 110 prior to installation onto the base assembly 100. When the base assembly is subject to the reflow process in a reflow oven, e.g., at 260° C., the low melting point metal 108 would melt, and the molten metal would pull apart towards the electrodes 104, 106, thus removing the conductive bridge between the electrodes before the device is even installed in the circuit to-be protected. The coating, e.g. oxide coating, applied to the low melting point metal layer 108 prevents the molten metal from separating during reflow. After reflow, when the device is installed in the circuit to-be-protected, the low melting point metal 108 needs to be able to separate and remove the conductive bridge between the electrodes 104, 106, such as during an over-temperature condition. Accordingly, the flux 112 is applied after reflow, such as when the cap is installed. When the flux 112 melts, and covers the low melting point metal 108, the flux 112 dissolves the coating, so that when the device heats to a temperature that exceeds the melting point of the low melting point metal 108, the molten metal is allowed to separate and cut off the electrical connection between the two electrodes 104, 106, allowing the device to properly detect an over-temperature condition.

Figure 4:
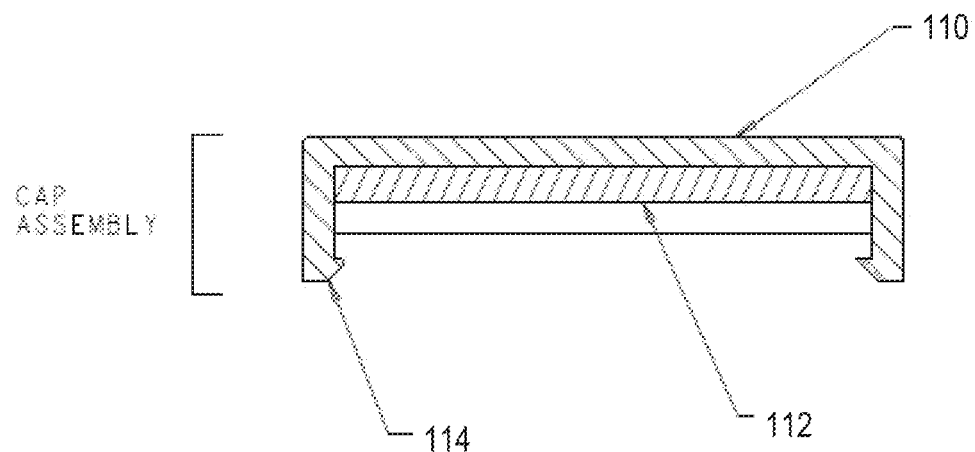
FIG. 4 shows a cross sectional view of the cap assembly shown in FIG. 3, including cap and flux provided inside the cap.
Figure 5:
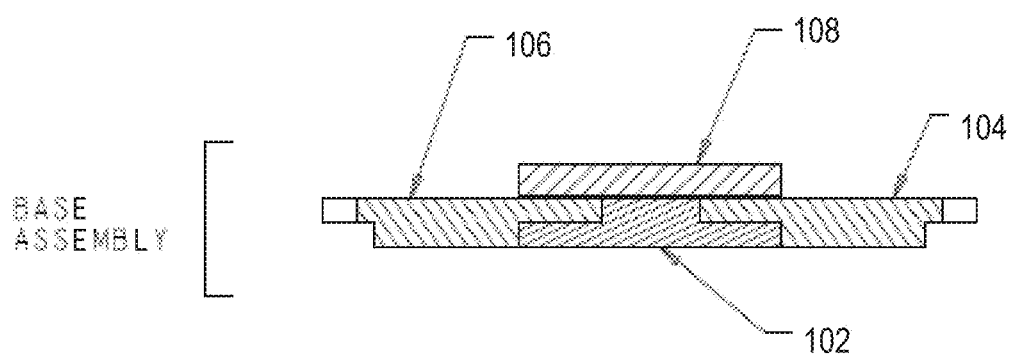
FIG. 5 shows a cross sectional view of the base assembly shown in FIG. 3.

FIG. 4 shows a cross sectional view of the cap assembly, including cap 110 and flux 112 provided inside the cap 110. FIG. 5 shows a cross sectional view of the base assembly 100. The cap includes protrusions 114 which include cap retention features that snap to the base assembly 100. The flux 112 provided inside the cap may be provided in a semi-solid condition. In the embodiment of FIGS. 1-4, at least the cap and flux may correspond to a means for activating the device in response to a force applied to the cap.

Figure 6:
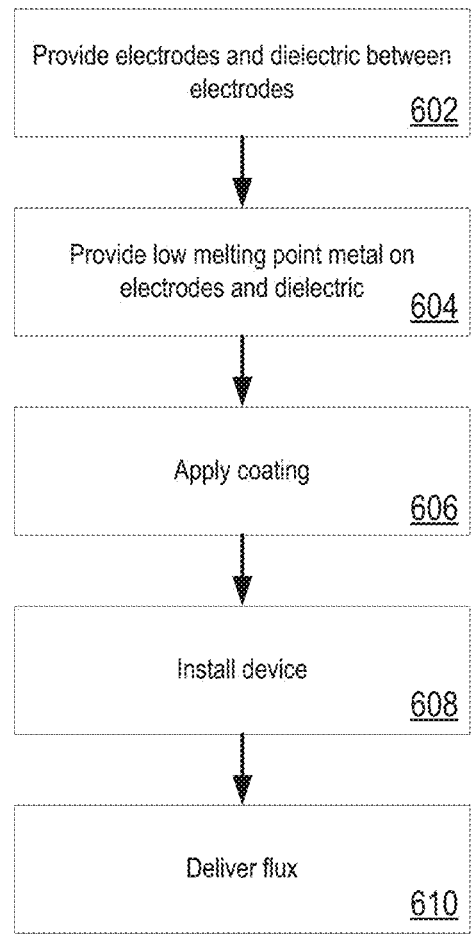
FIG. 6 shows an example of a process for manufacturing the reflowable circuit protection device shown in FIGS. 1-5.

FIG. 6 shows an example of a process for manufacturing a reflowable circuit protection device, such as the device shown in FIGS. 1-2. A dielectric is provided between two electrodes (602). A low melting point metal, such as a solder link, e.g., tin, silver, bismuth, is provided above at least a portion of the dielectric, and two electrodes such that the low melting point metal provides a conductive bridge between the two electrodes (604). The low melting point metal may be applied over the dielectric and electrodes using ultrasonic welding. The solder link may also be attached by heating the device to approximately the melting point of the solder link, such as where the electrodes are gold plated electrodes. As another alternative, a solder paste may be applied over the dielectric and electrodes, and then the low melting point metal is applied over the solder paste. The device is heated and the solder paste, which has a lower melting point than the low melting point metal, melts and creates a bond between the paste and low melting point metal. For example, where a solder paste having a melting point of 140° C. and a low melting point metal having a melting point of 210° C. are used (relative to a reflow temperature of, for example, 260° C.), the device may be heated to 150° C. to melt the solder paste and create a bond. Where a solder paste is used, a washing or cleaning step may follow application of the low melting point metal.

A coating is applied to the low melting point metal (606). When the low melting point metal melts, the molten metal would pull apart toward the electrodes, which would break the electrical connection between the electrodes. The coating applied to the low melting point metal prevents the metal from pulling apart toward the electrodes when the metal melts, such as during reflow when the device is heated to a temperature that is higher than the melting point of the low melting point metal. In this manner, the low melting point metal holds its form during reflow. The coating may be an oxide coating formed by oxidizing the low melting point metal. The oxide coating may be formed by heating the device to a temperature below the melting point of the low melting point metal. The oxide coating will grow around low melting point metal as the device is heated without melting the low melting point metal. For example, where a low melting point metal having a melting point of 210° C. is used, the device may be heated to just under the melting point of the metal, e.g., 200° C., to accelerate formation of the oxide coating.

The base assembly (dielectric, electrodes and low melting point metal) is installed on a printed circuit board using a reflow process (608). A flux is delivered over the low melting point metal (610). The flux is a material that dissolves the coating that is over the low melting point metal. In the example where the coating is an oxide, the flux may be a thermoplastic flux, such as rosin, organic or inorganic acid, or like substance. The flux may be inside of the cap such that the flex is delivered by installing the cap on the base assembly. The flux may also be a water soluble coating that can be dissolved by a washing step after reflow.

Once installed in a circuit to-be-protected, when the circuit is subject to an over-temperature condition, e.g., a temperature that is higher than the melting point of the low melting point metal, the low melting point metal melts and pulls apart towards the electrodes, breaking the electrical connection between electrodes and turning off the device.

Figure 7:
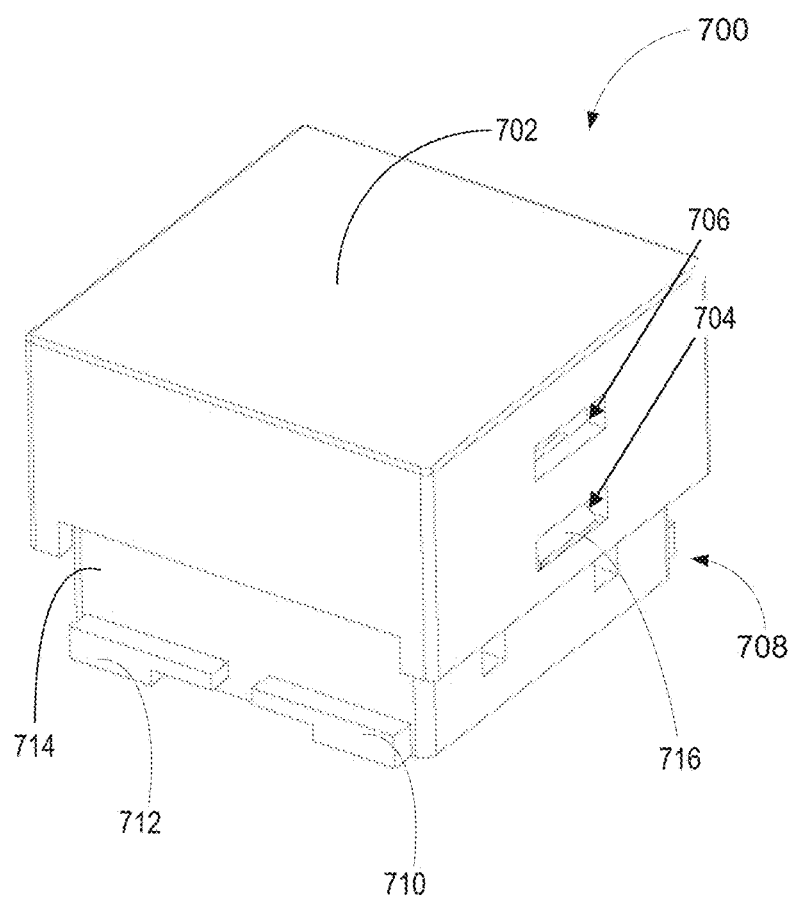
FIG. 7 shows another an example of another reflowable circuit protection device.

FIG. 7 shows another an example of another reflowable circuit protection device 700. The circuit protection device 700 includes a cap 702 with retention holes 704 and 706 defined through the side of the cap 702. The cap 702 may include retention holes 704 and 706 on one side of the cap, or on two opposing sides of the cap.

Figure 8:
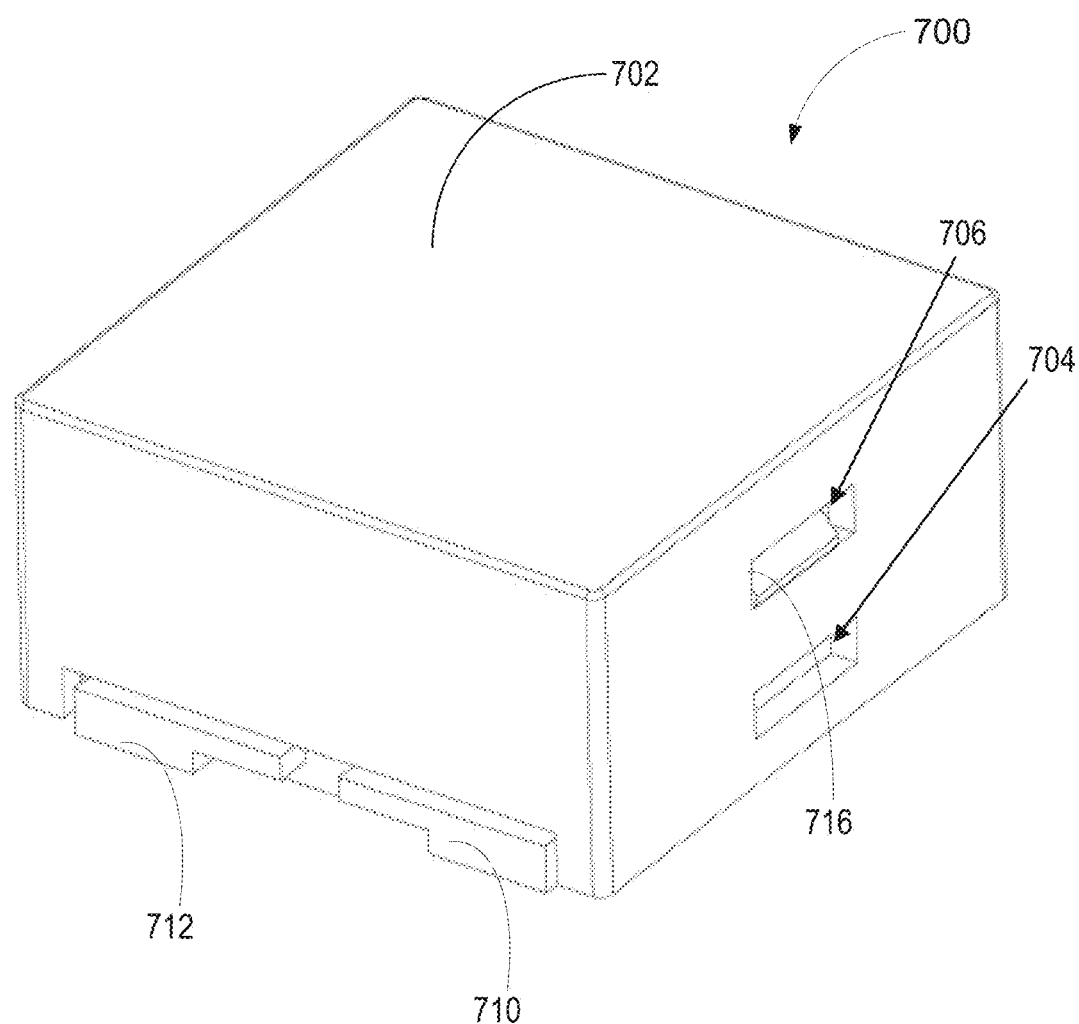
FIG. 8 shows the reflowable circuit protection device shown in FIG. 7 with the cap locked into an activation position.

The device 700 includes a base assembly 708 including electrodes (SMT terminals) 710 and 712, and a non-conductive, e.g., plastic, outer walls 714. The base assembly 708 includes a retention tab 716 that is shaped to fit into either of the retention holes 704 or 706 to hold the cap 702 in one of two positions relative to the base assembly 708. When the retention tab 716 is fit into the retention hole 704, the cap 702 is in a pre-reflow position. When the retention tab 716 is fit into the retention hole 706, the cap 702 is in an activation position. FIG. 8 shows the reflowable circuit protection device 700 shown in FIG. 7 with the cap 702 locked into the activation position, i.e., retention tab 716 fit into the retention hole 706.

Figure 9:
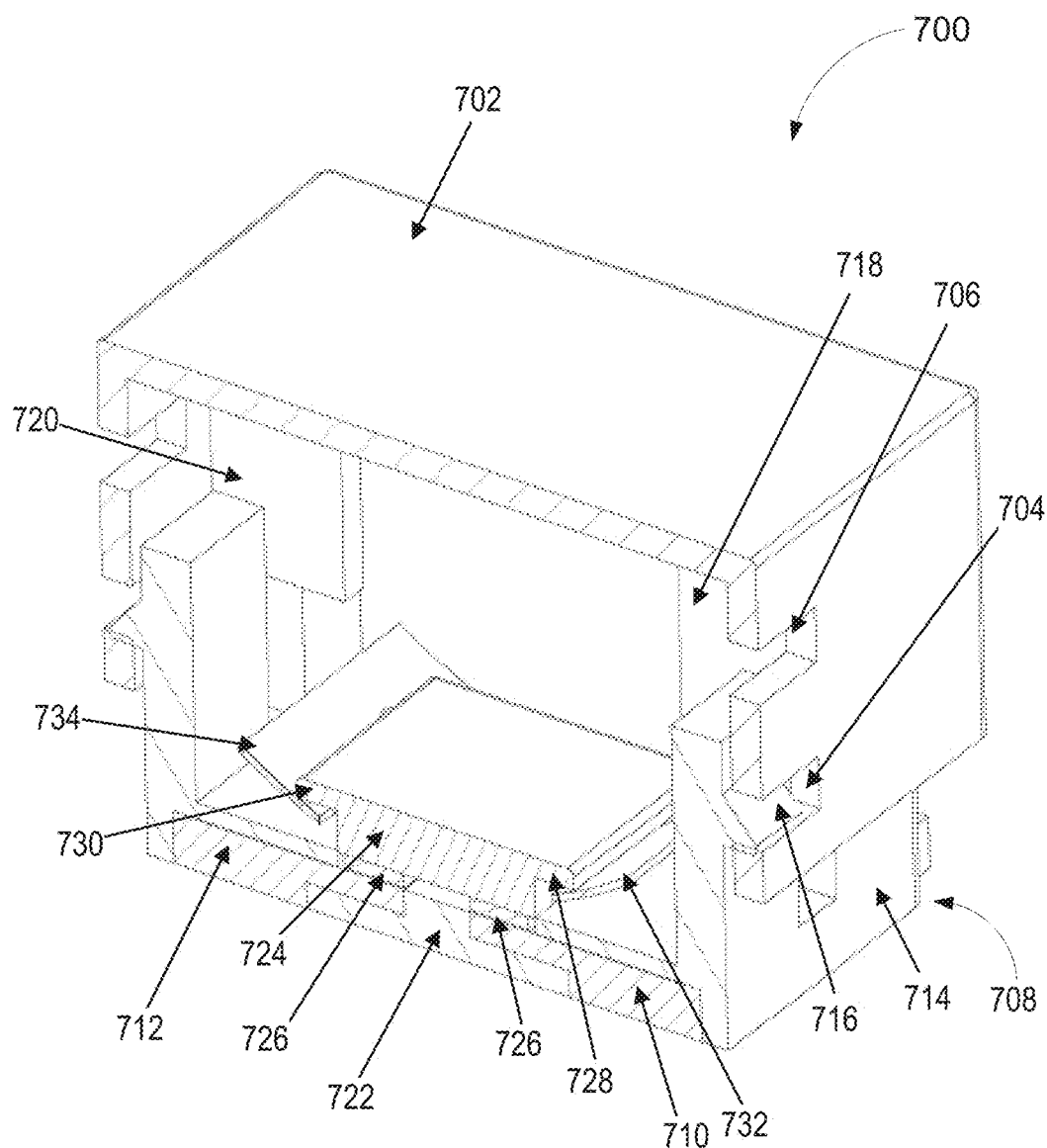
FIG. 9 shows a cross sectional view of the reflowable circuit protection device shown in FIG. 7.

FIG. 9 shows a cross sectional view of the reflowable circuit protection device 700 shown in FIG. 7. In FIG. 9 the cap 702 is in the pre-reflow position as indicated by the retention tab 716 being fit into the retention hole 704. The cap 702 includes ribs 718, 720 protruding from an inside surface of a side of the cap 702 towards the inside of the cap 702.

The base assembly 708 further includes a dielectric 722 between the electrodes 710 and 712. The base assembly 708 includes a bridging terminal 724 and a solder link layer 726 between the bridging terminal 724 and at least a portion of an upper surface of the electrodes 710, 712 and dielectric 722. The solder link layer 726 adheres the bridging terminal 724 to the electrodes 710, 712. The solder link layer 726 is characterized by a melting point that is lower than a reflow temperature. The solder link layer 726 and bridging terminal 724 form a conductive path between the electrodes 710 and 712 in FIG. 9. The bridging terminal 724 may include a conductive metal, such as copper, nickel, silver, aluminum, or other like metals. The bridging terminal 724 includes cantilevered ends 728, 730.

The base assembly 708 includes springs 730 and 732 on either side of the bridging terminal 722. In FIG. 9 the springs 732 and 734 are leaf springs. For the sake of explanation, the operation of the reflowable circuit protection device 700 is described using leaf springs, but it will be understood that other types of springs may be used. When the cap 702 is in the pre-reflow position, the springs 732 and 734 are not in tension. When a downward force is applied to the cap 702 to press the cap 702 to the activation position, the ribs 718 and 720 press down on the springs 732 and 734, respectively, to put the springs 732 and 734 in tension.

Figure 10:
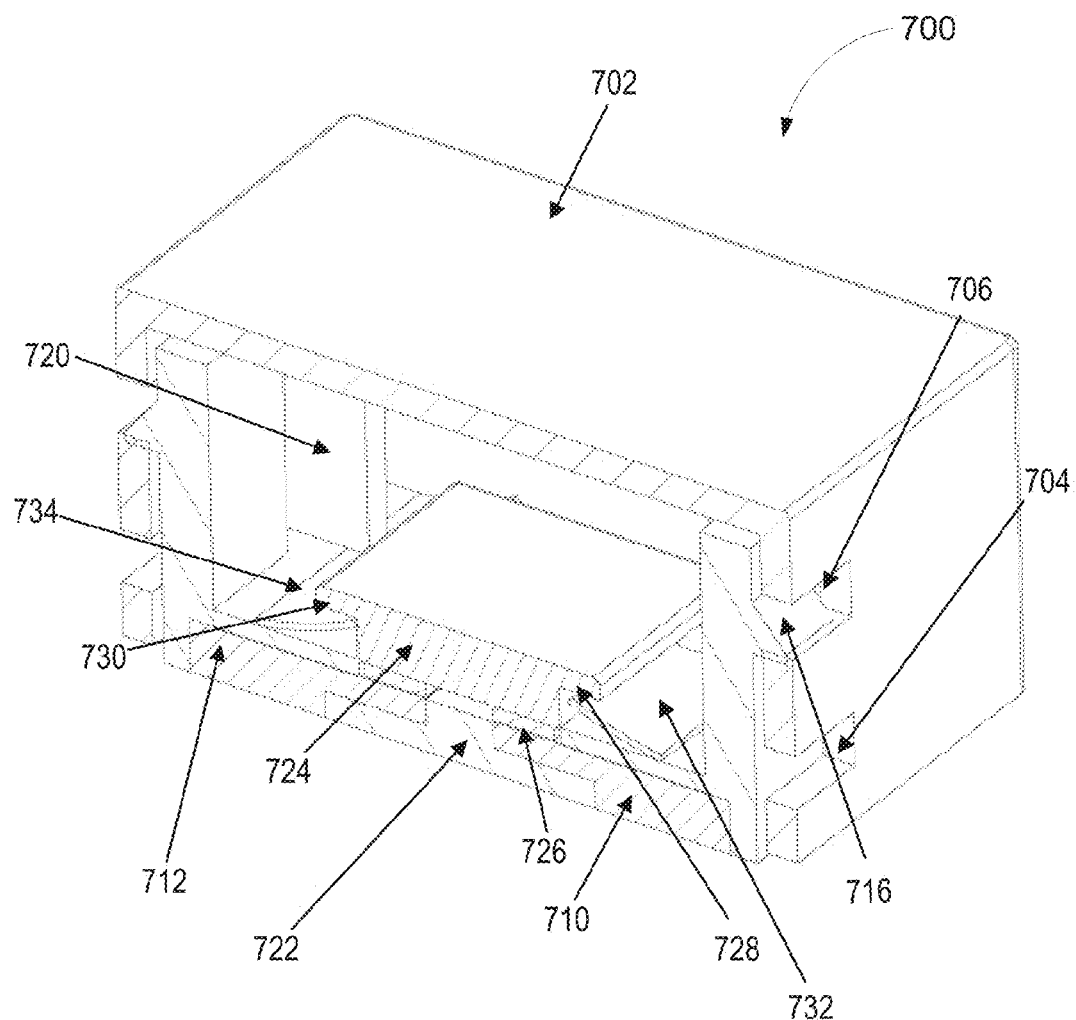
FIG. 10 shows a cross sectional view of the reflowable circuit protection device shown in FIG. 7 with the cap locked into the activation position.

FIG. 10 shows a cross sectional view of the reflowable circuit protection device shown in FIG. 7 with the cap 702 locked into the activation position and the springs 732 and 734 in tension. The rib 720 applies a downward force on the spring 734. In particular, the rib 720 applies a downward force on one end of the spring 734, which causes the other end of the spring 734 to apply an upward force on an underside of the cantilevered end 730 of the bridging terminal 724. The rib 718 is not shown in FIG. 9, but it will be understood that the rib 718 similarly applies a downward force on one end of the spring 732, which causes the other end of the spring 732 to apply an upward force on an underside of the cantilevered end 728 of the bridging terminal 724. Because the bridging terminal 724 is held in place by the solder link 726, the upward force exerted by the springs 732 and 734 does not cause the bridging terminal 724 to lift upwards. In this manner, the springs 732 and 734 are placed in tension when the cap 702 is pressed to the activation position.

The cap 702 is placed in the activation position after reflow. During reflow, the solder link 726, which has a melting point that is lower than the reflow temperature, would melt. If the springs 732 and 734 were in tension and exerting an upward force on the bridging terminal 724, then during reflow when the solder link 726 melts, the solder link 726 would no longer hold the bridging terminal 724 in place. Because the cap 702 is in the reflow position during reflow, the springs 732 and 734 are not in tension and when the solder link 726 melts during reflow, the bridging terminal 724 remains in place. After reflow the device cools, the solder link 726 solidifies, and again holds the bridging terminal 724 in place. The cap 702 is then pressed down to the activation position to place the springs 732 and 734 in tension and activate the device 700.

Figure 11:
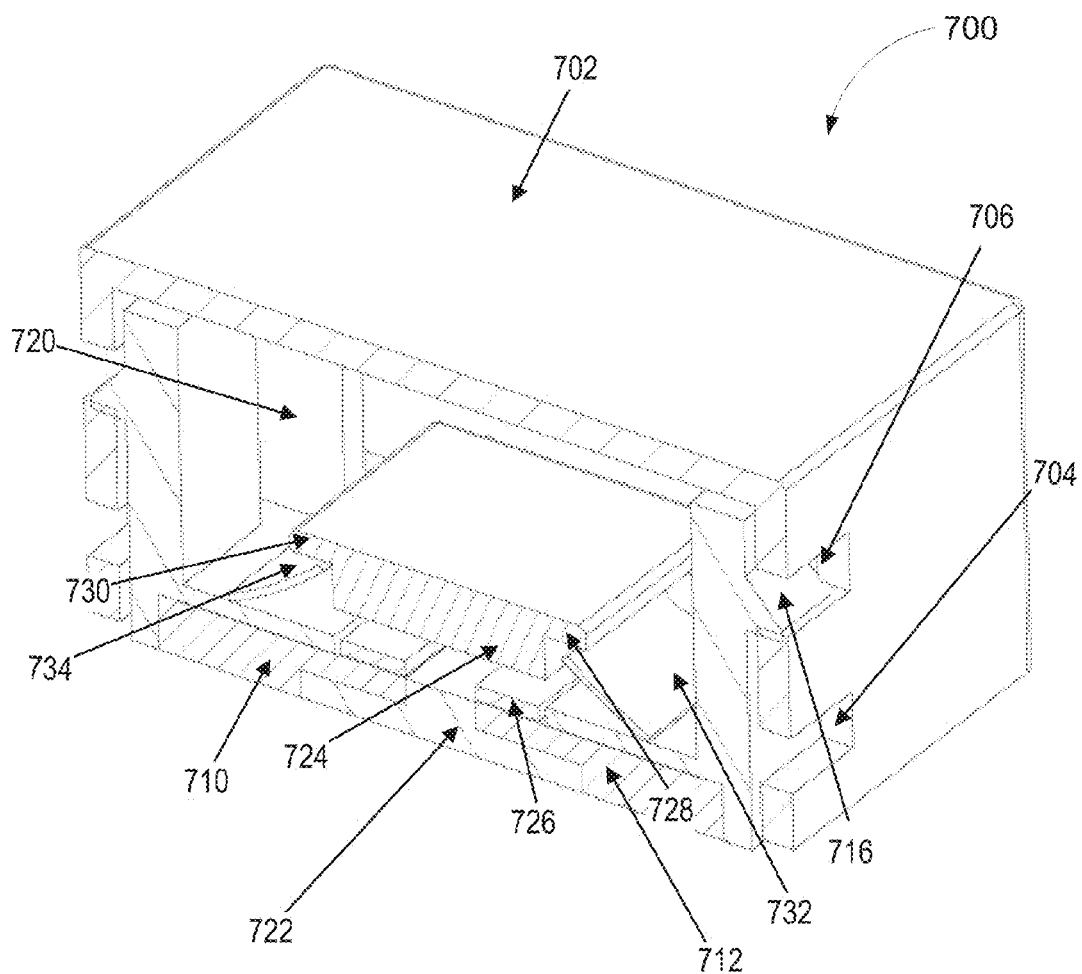
FIG. 11 shows a cross section view of the reflowable circuit protection device shown in FIG. 7 in an over-temperature condition.

FIG. 11 shows a cross section view of the reflowable circuit protection device shown in FIG. 7 in an over-temperature condition. Once activated, the device 700 is structured to detect and react to an over-temperature condition that might damage the circuit in which the circuit protection device 700 is installed. When the device 700 is heated to a temperature that exceeds the melting point of the solder link 726, the solder link 726 melts. When the solder link 726 melts, the bridging terminal 724 is no longer held in place to resist the upward force of the springs 732 and 734 in tension, and the bridging terminal 724 is forced upward. In addition, as the solder link 726 melts, the molten solder link 726 will pull towards the electrodes 710 and 712. This, along with the lifting of the bridging terminal, causes the electrical connection between the electrodes 710 and 712 to be severed, thus turning off the device. In the embodiment of FIGS. 7-11, at least the cap with retention holes and ribs may correspond to a means for activating the device in response to a force applied to the cap.

Figure 12:
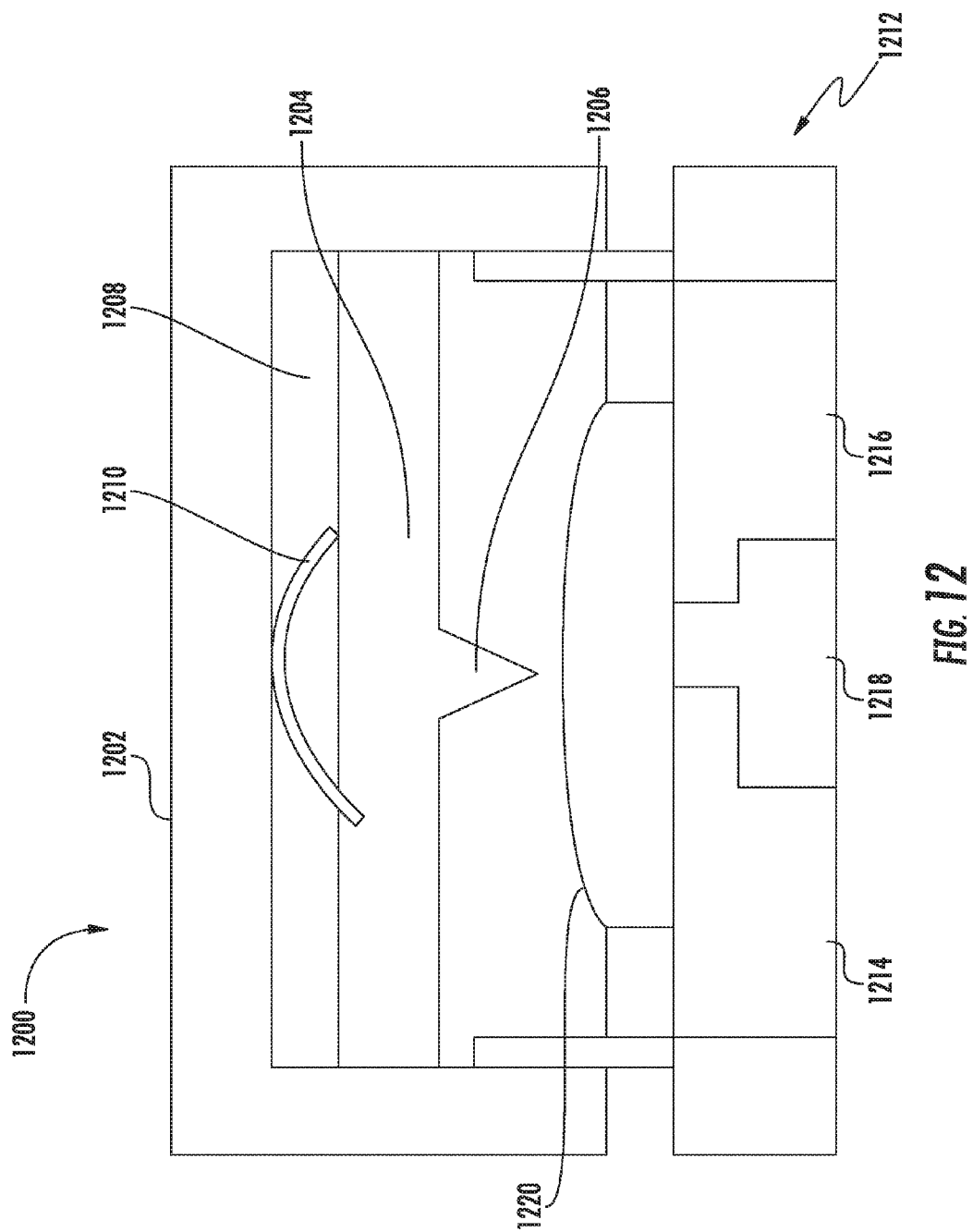
FIG. 12 shows a cross sectional view of an example of another reflowable circuit protection device with a cap in an up position.

FIG. 12 shows a cross sectional view of an example of another reflowable circuit protection device 1200 with a cap 1202 in the reflow position. Similar to the device 700 shown in FIG. 7, the cap 1202 in device 1200 may be placed in a reflow and activation position. Also similar to the device 700, the cap 1202 may include retention holes that receive a retention tab to allow the cap 1202 to move from the reflow position to the activation position by a downward force on the cap 1202.

The cap 1202 includes a plate 1204 extending laterally within the cap 1202, with a knife rib 1206 extending down from a bottom surface of the plate 1204. The plate 1204 and knife rib 1206 may be formed from a non-conductive material, such as a plastic, that has a melting point above a reflow temperature. The knife rib 1206 may also be coated with flux. The plate 1204 and knife rib 1206 may be formed of the same material as the cap 1202. The knife rib 1206 forms to a point capable of breaking through a solder surface tension, as will be explained below. The cap 1202 includes a gap 1208 defined between an upper surface of the plate 1204 and a lower surface of the top of the cap 1202. The cap 1202 also includes a spring 1210 above the plate 1204 within the gap 1208. The spring 1210 shown in FIG. 12 is not in tension. The height of the gap 1208 is at least as much to accommodate the spring 1210 when it is not in tension.

The device 1200 includes a base assembly 1212 that includes electrodes 1214 and 1216, a dielectric 1218, and a solder pre-form 1218 formed above the dielectric 1212 and electrodes 1214 and 1216. The solder pre-form 1218 provides an electrical connection between the electrodes 1214 and 1216 and has a melting point that is lower than that of a reflow temperature.

Figure 13:
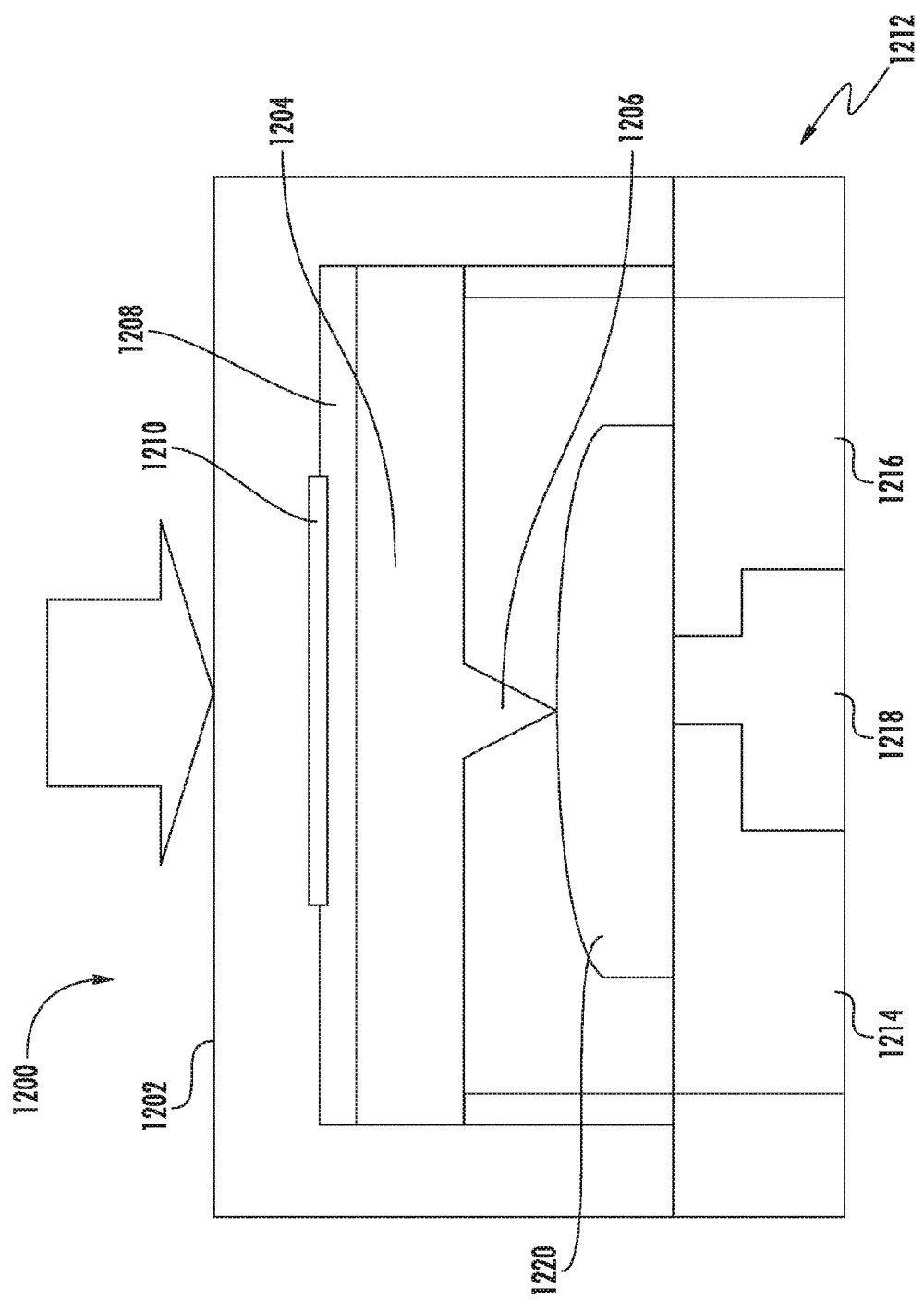
FIG. 13 shows a cross sectional view of the reflowable circuit protection device shown in FIG. 12 with a cap in a down position.

FIG. 13 shows a cross sectional view of the reflowable circuit protection device shown in FIG. 12 with the cap 1202 in an activation position. As discussed above, the cap 1202 is placed in the activation position after reflow. To be placed in an activation position, a downward force is placed on the cap 1202, which reduces the height of the gap 1208, which in turn brings the spring 1210 in tension. The cap 1202 is held in place despite the spring being in tension because the cap includes, for example, retention holes that receive a retention tab, such as those shown in FIG. 7. In the case of a leaf spring, the spring 1210 is brought into tension when the leaf spring is flattened. When the cap 1202 is in the activation position, the bottom tip of the knife rib 1206 abuts with an upper surface of solder pre-form 1220. The spring 1210 in tension exerts a downward force on the plate 1204. That downward force is resisted by the solder pre-form 1220. During an over-temperature condition, the solder pre-form melts, and the resistance to the downward force lessens until the spring 1210 decompresses and presses the plate 1204 and knife rib 1206 down through the solder pre-form 1220, as shown in FIG. 14.

Figure 14:
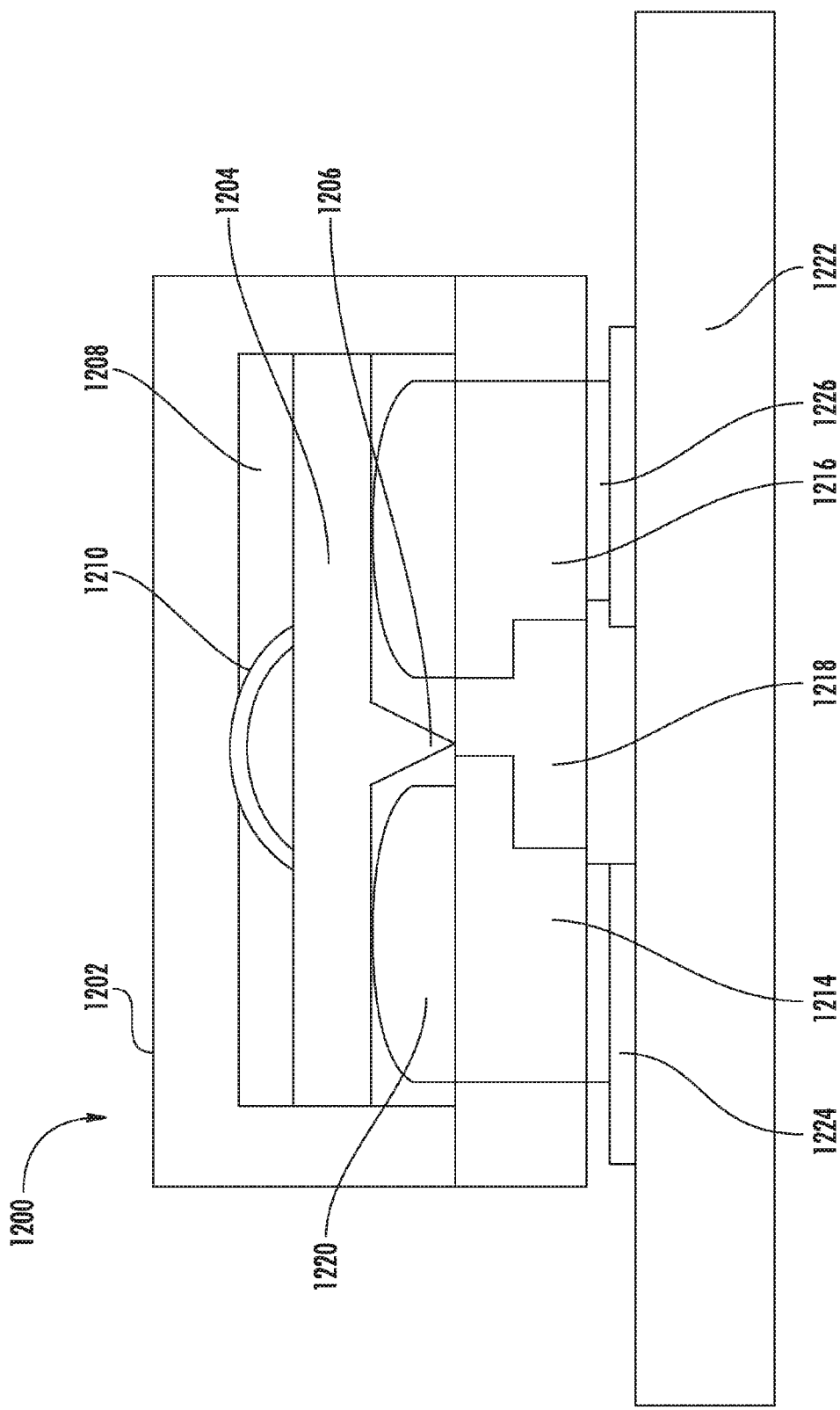
FIG. 14 shows a cross sectional view of the reflowable circuit protection device shown in FIG. 12 in an over-temperature condition.

FIG. 14 shows a cross sectional view of the reflowable circuit protection device shown in FIG. 12 in an over-temperature condition. During an over-temperature condition where the temperature of the device 1200 exceeds the melting point of the solder pre-form 1220, the solder pre-form begins to melt and pull towards the electrodes 1214 and 1216. The resistance to downward force exerted by the spring 1210 in tension lessens until the spring 1210 decompresses and forces the plate 1204 and knife rib 1206 downward. The knife rib 1206 breaks the solder pre-form surface tension, cuts or passes through the solder pre-form, breaking the electrical connection between the electrodes 1214, 1216. FIG. 14 shows the device 1200 installed on a printed circuit board 1222 as a result of the reflow process, and connected to contact pads 1224 and 1226. In the embodiment of FIGS. 12-14, at least the cap with spring, plate, and knife rib may correspond to a means for activating the device in response to a force applied to the cap.

Figure 15:
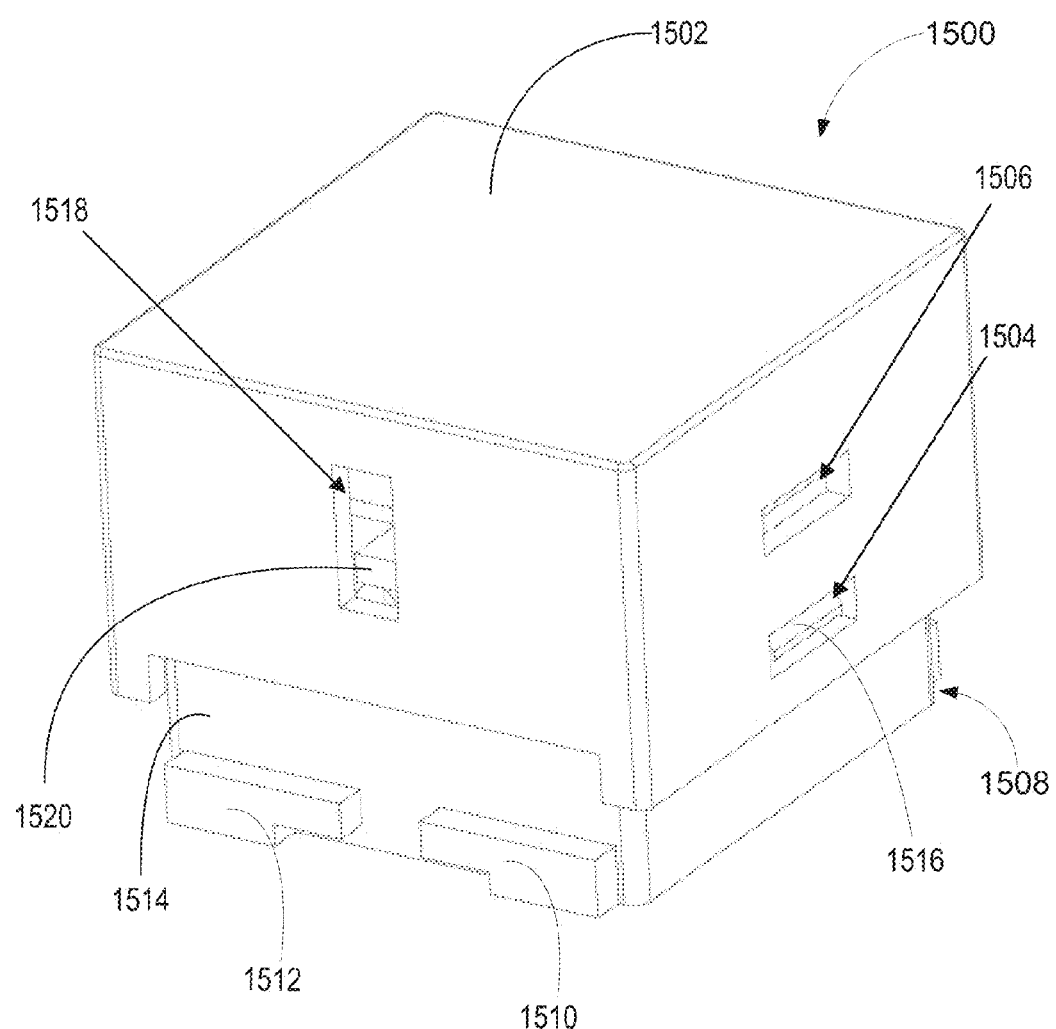
FIG. 15 shows another an example of another reflowable circuit protection device.

FIG. 15 shows another an example of another reflowable circuit protection device 1500. The circuit protection device 1500 includes a cap 1502 with retention holes 1504 and 1506 defined through the side of the cap 1502. The cap 1502 may include retention holes 1504 and 1506 on one side of the cap, or on two opposing sides of the cap 1502. The cap 1502 may also include another opening 1518 defined on a side of the cap 1502 that is adjacent to the side of the cap 1502 with the retention holes 1504 and 1506. A lateral protrusion 1520 extending from a plate 1522 inside the cap 1502 (shown in FIG. 17) may extend at least partially through the opening 1518, the opening 1518 serving as a guide for the movement of the plate 1522.

Figure 16:
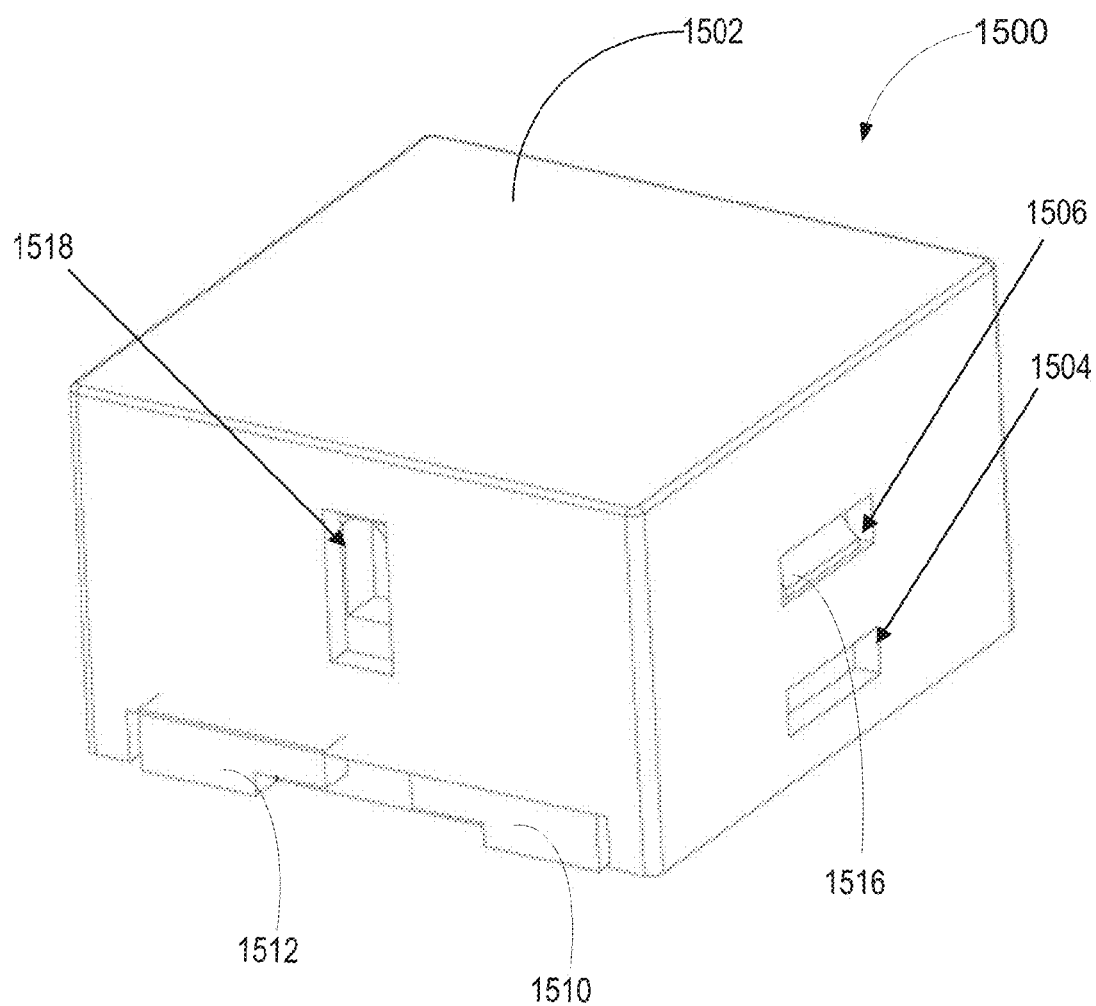
FIG. 16 shows the reflowable circuit protection device shown in FIG. 15 with the cap locked into the activation position.

The device 1500 includes a base assembly 1508 including electrodes (SMT terminals) 1510 and 1512, and a non-conductive, e.g., plastic, outer walls 1514. The base assembly 1508 includes a retention tab 1516 that is shaped to fit into either of the retention holes 1504 or 1506 to hold the cap 1502 in one of two positions relative to the base assembly 1508. When the retention tab 1516 is fit into the retention hole 1504, the cap 1502 is in a pre-reflow position. When the retention tab 1516 is fit into the retention hole 1506, the cap 1502 is in an activation position. FIG. 16 shows the reflowable circuit protection device 1500 shown in FIG. 15 with the cap 1502 locked into the activation position, i.e., retention tab 1516 fit into the retention hole 1506.

Figure 17:
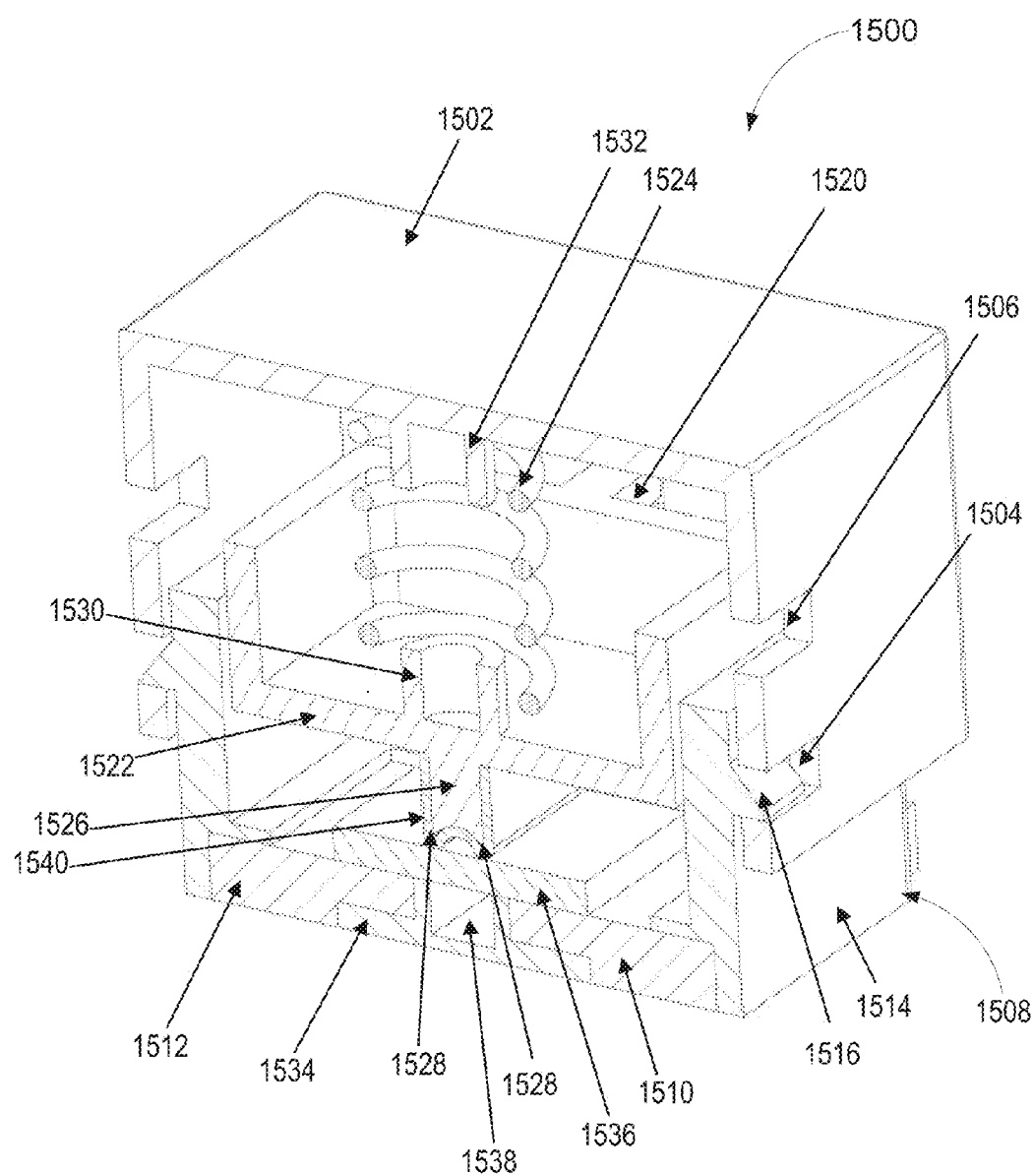
FIG. 17 shows a cross sectional view of the reflowable circuit protection device shown in FIG. 15.

FIG. 17 shows a cross sectional view of the reflowable circuit protection device 1500 shown in FIG. 15. In FIG. 17 the cap 1502 is in the pre-reflow position as indicated by the retention tab 1516 being fit into the retention hole 1504. The cap 1502 includes a vertically movable plate 1522 and a coil spring 1524 extending between the plate 1522 and the inside surface of the top of the cap 1502. In the pre-reflow position the spring 1524 is not in a compressed state, or is in a low compression state. The plate 1522 includes protrusion 1526 extending vertically down from a bottom surface of the plate 1522. The protrusion 1526 includes knife ribs 1528 extending down vertically. FIG. 17 shows two knife ribs 1528 extending from the protrusion 1526, but it will be understood that the protrusion may include one rib or more than two ribs. The plate 1522 may include a post 1530, or protrusion, extending up towards the top of the cap 1502. The cap may include a similar post 1532, or protrusion, extending down from the inside surface of the top of the cap 1502. The ends of the coil spring 1524 fit around the posts to prevent the spring 1524 from sliding in a lateral or sideways direction inside the cap 1502.

The base assembly 1508 includes a dielectric 1534 between the electrodes 1510 and 1512. The base assembly 1508 includes a solder pre-form 1536 attached to the electrodes 1510 and 1512 (e.g., attached by heating) such that the solder pre-form 1536 provides an electrical connection between electrodes 1510 and 1512. The device 1500 is subject to reflow while in the pre-reflow position. During reflow the solder pre-form 1536, having a melting point lower than a reflow temperature, would melt. After reflow the pre-form 1536 solidifies and the electrical connection between electrodes 1510 and 1512 is maintained.

Figure 18:
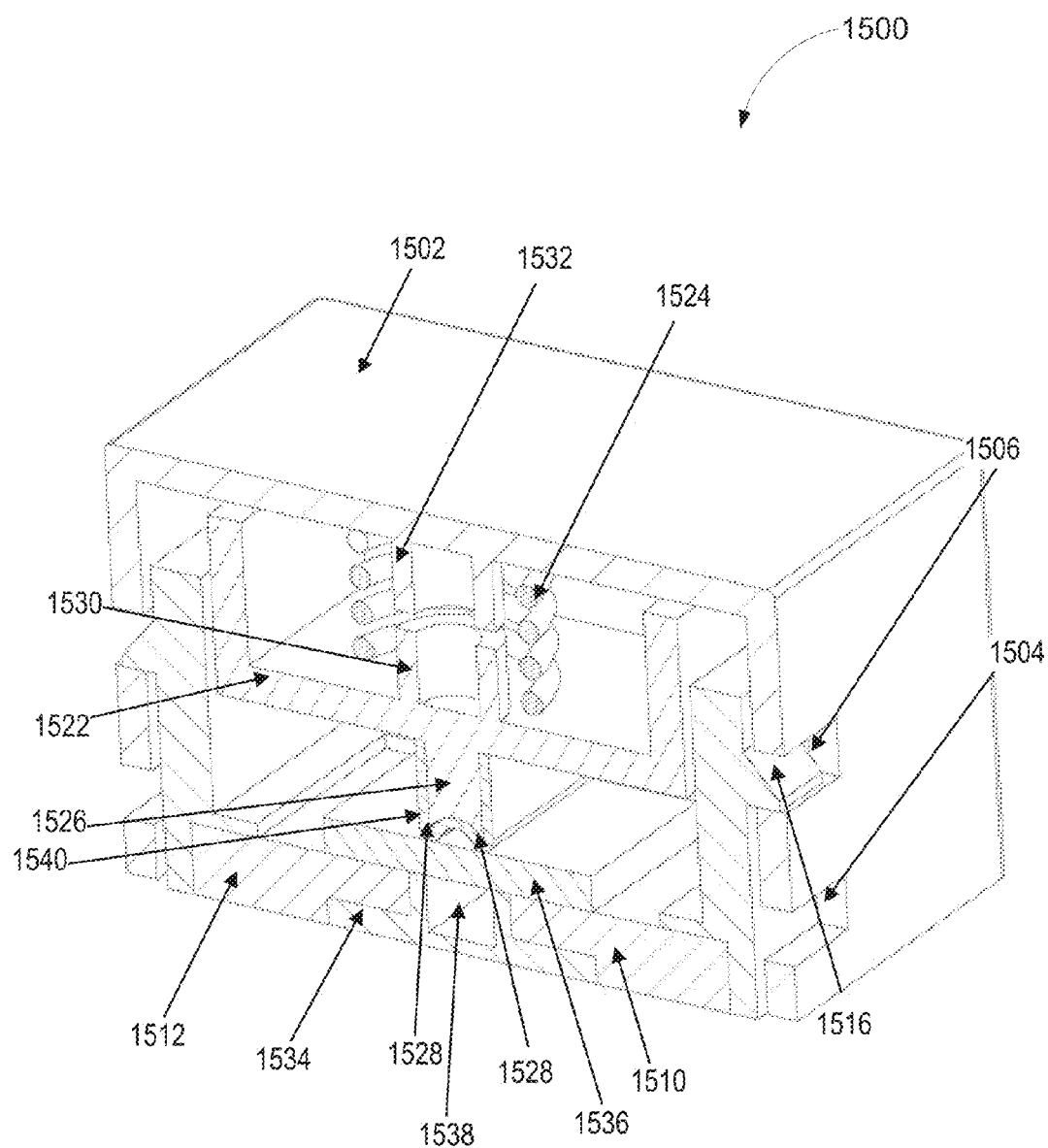
FIG. 18 shows a cross sectional view of the reflowable circuit protection device shown in FIG. 15 with the cap locked into the activation position.

FIG. 18 shows a cross sectional view of the reflowable circuit protection device 1500 shown in FIG. 15 with the cap locked into the activation position. After the device 1500 has gone through reflow and the device 1500 is installed on a circuit board, a downward force is applied to at least a portion of the top of the cap 1502 to place the device 1500 in the activation position. In the activation position, the plate 1522 and top of the cap 1502 are brought closer together, thereby compressing the coil spring 1524. The decompression force of the coil spring 1524 causes the knife ribs 1528 to exert a downward pressure on the solder pre-form 1536.

If the device 1500 heats above the melting point of the solder pre-form 1536, the pre-form 1536 melts and the knife ribs 1528 and protrusion 1526 press through the pre-form 1536 and sever the electrical connection between electrodes 1510 and 1512. Upward movement of the cap 1502 is resisted by the retention tab 1516, thus when the solder pre-form melts the decompression of the spring 1524 presses the plate 1522 downward.

Figure 19:
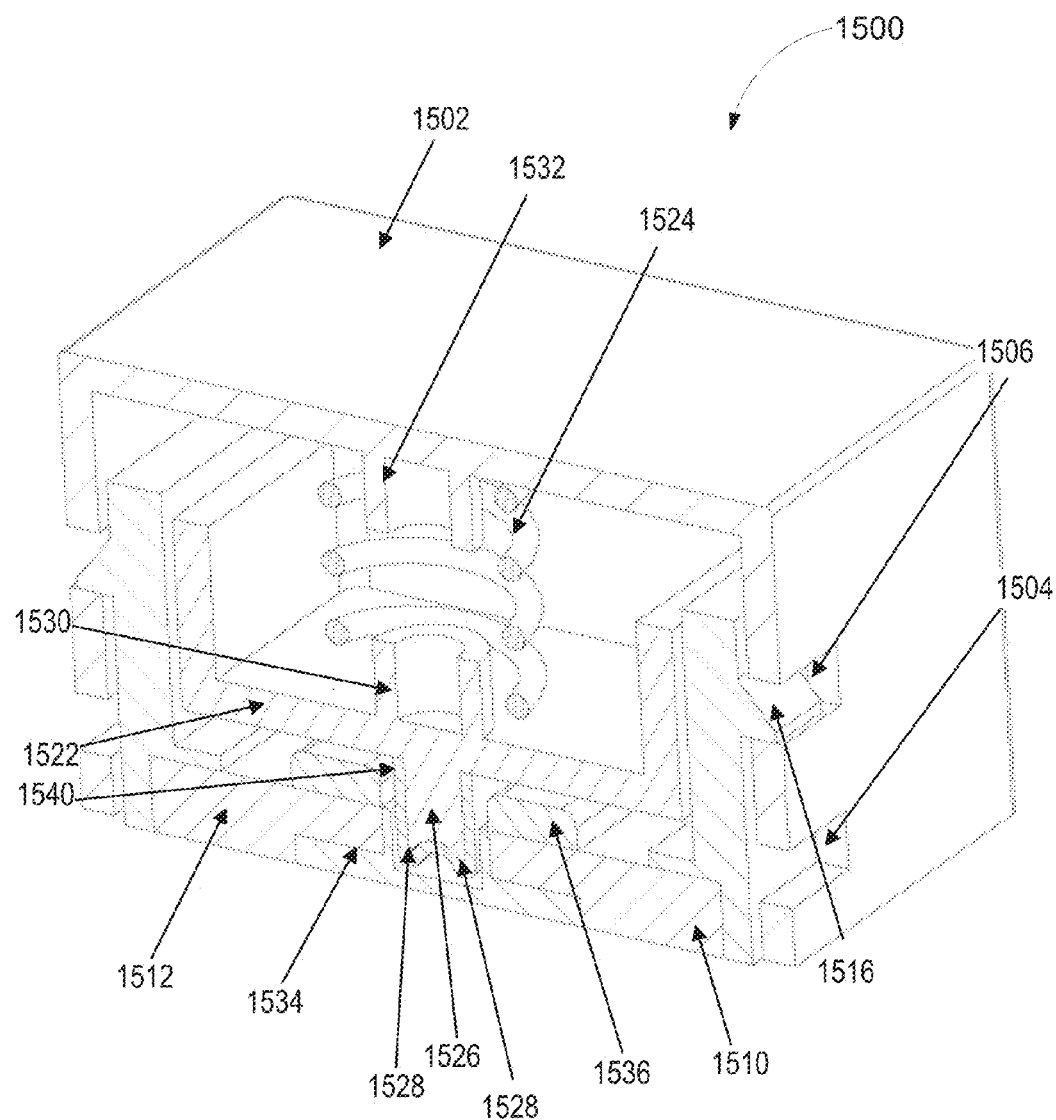
FIG. 19 shows a cross sectional view of the reflowable circuit protection device shown in FIG. 15 in an over-temperature condition.

FIG. 19 shows a cross sectional view of the reflowable circuit protection device 1500 shown in FIG. 15 in an over-temperature condition. As can be seen, when the pre-form 1536 melts the decompression force of the coil spring 1524 presses the protrusion 1526 and ribs 1528 through the pre-form 1536 into the space, or gap, 1538 defined within the dielectric below the pre-form 1536. When this occurs, the electrical connection between the electrodes 1510 and 1512 is severed, and the device 1500 is turned off. The protrusion 1526 and knife ribs 1528 shown in FIGS. 17-19 are coated with a flux 1540. An oxide coating around the pre-form 1536 may prevent the pre-form 1536 from melting and filling the space 1538 during reflow. In the embodiment of FIGS. 15-19, at least the cap with spring, plate, protrusions, and knife ribs may correspond to a means for activating the device in response to a force applied to the cap.

Figure 20:
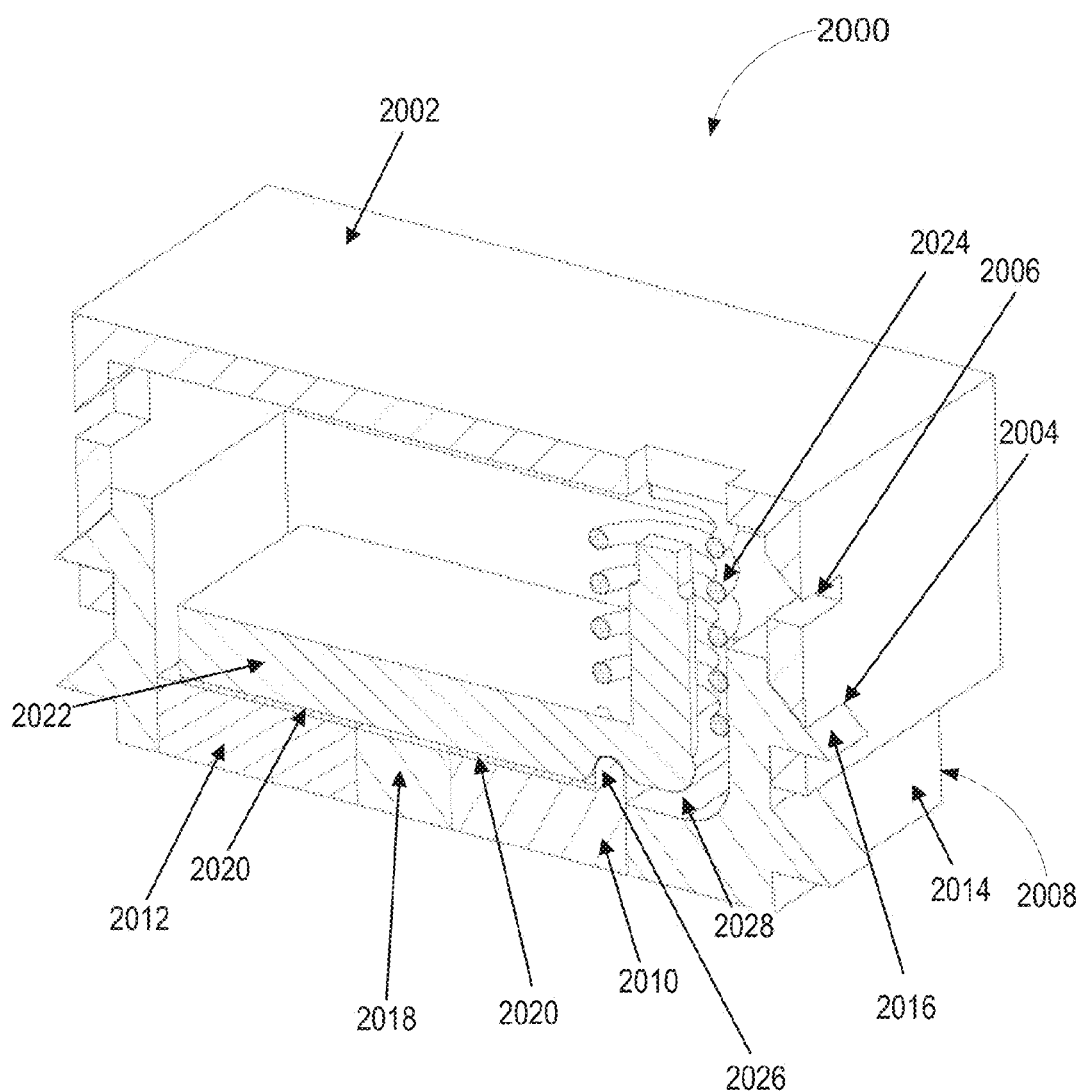
FIG. 20 shows a cross sectional view of another example of a reflowable circuit protection device that uses a coil spring inside the cap.

FIG. 20 shows a cross sectional view of another example of a reflowable circuit protection device 2000 that uses a coil spring inside the cap 2002. The cap 2002 includes retention holes 2004 and 2006 defined through the side of the cap 2002. The cap 2002 may include retention holes 2004 and 2006 on one side of the cap, or on two opposing sides of the cap 2002.

Figure 21:
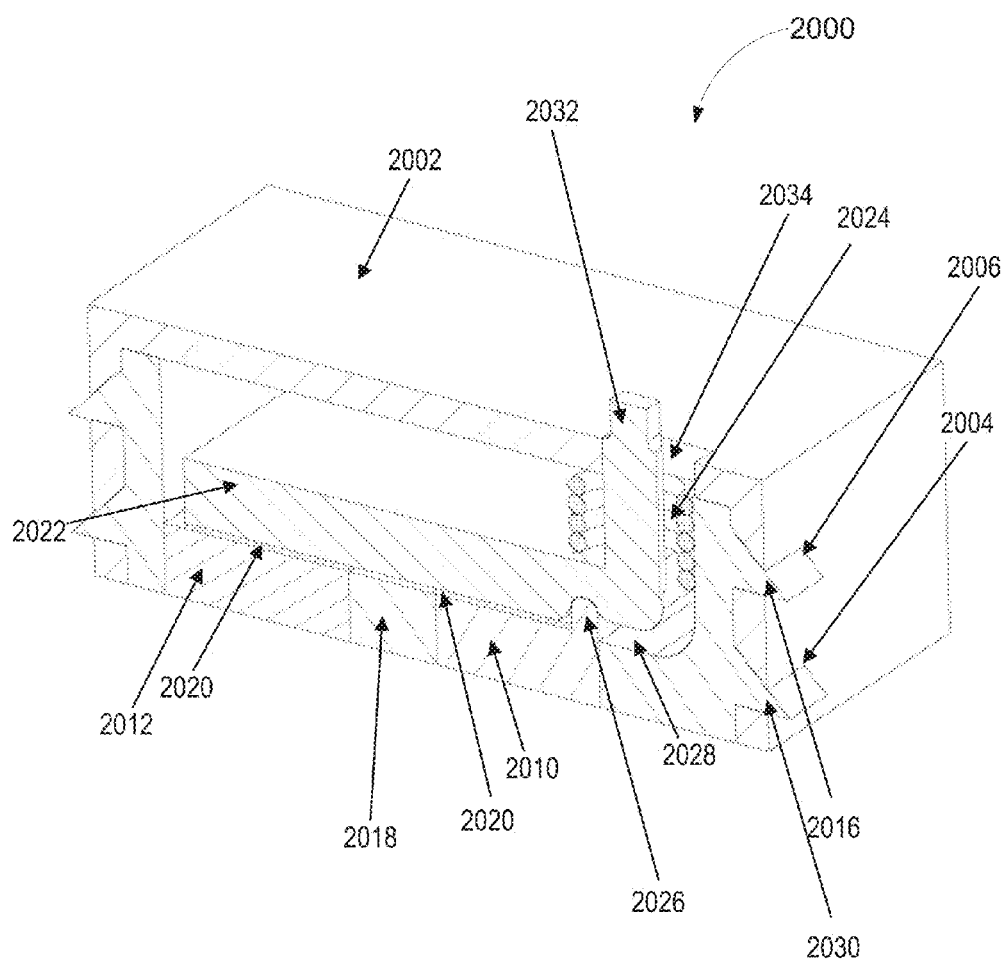
FIG. 21 shows a cross sectional view of the reflowable circuit protection device shown in FIG. 20 with the cap locked into the activation position.

The device 2000 includes a base assembly 2008 including electrodes 2010 and 2012, and a non-conductive, e.g., plastic, outer walls 2014. The base assembly 2008 includes a retention tab 2016 that is shaped to fit into either of the retention holes 2004 and 2006 to hold the cap 2002 in one of two positions relative to the base assembly 2008. When the retention tab 2016 is fit into the retention hole 2004, as shown in FIG. 20, the cap 2002 is in a pre-reflow position. When the retention tab 2016 is fit into the retention hole 2006, the cap 2002 is in an activation position. FIG. 21 shows the reflowable circuit protection device 2000 shown in FIG. 20 with the cap 2002 locked into the activation position, i.e., retention tab 2016 fit into the retention hole 2006. The base assembly 2008 also includes a dielectric 2018 between electrodes 2010 and 2012. A solder past 2020 is formed above one or more of the electrodes 2010 and 2012.

The device 2000 includes a cantilever terminal 2022 that has a horizontal portion connected, or bonded, to the solder paste 2020 and a vertical portion extending from one end of the horizontal portion. The terminal 2022 is made of a conductive material and provides an electrical connection between the electrodes 2010 and 2012. The device 2000 includes a coil spring 2024 wrapped around the vertical portion. When the device 2000 is in the pre-reflow position, the coil spring 2024 is not in a compressed state.

The electrode 2010 includes a protrusion 2026 having a rounded or pointed end. A bottom surface of the cantilever terminal 2022 includes a cutout portion that fits over the protrusion 2026. The location of the protrusion 2026 and corresponding cutout are such that the vertical portion of the terminal 2022 and horizontal portion of the terminal are on separate sides of the of the protrusion in a lateral direction. In addition, a lower surface of the side of the terminal 2022 corresponding to the horizontal portion extends lower, or further from the top of the cap than a lower surface of the side of the terminal 2022 corresponding to the vertical portion. In this manner, a gap or space 2028 is defined below the bottom surface of the vertical portion of the terminal 2022. When the device 2000 is subject to reflow and installed on the circuit to be protected, the solder paste 2020 may melt and the horizontal portion of the terminal 2022 no longer adheres to the paste 2020, but because the spring 2024 is not compressed during reflow, the device does not open. After reflow and the paste 2020 has cooled and the terminal 2022 again adheres to the past 2020, a downward force is applied to at least a portion of the top of the cap 2002 to move the cap 2002 to the activation position and compress the spring 2024.

FIG. 21 shows a cross sectional view of the reflowable circuit protection device 2000 shown in FIG. 20 with the cap 2002 locked into the activation position, shown by retention tab 2016 being inserted into retention hole 2006. The device 2000 may include a second retention tab 2030 that inserts into the retention hole 2004 when the cap is at the activation position. In the activation position, a top section 2032 of the vertical portion of the terminal 2022 extends through an opening 2034 defined in the top of the cap 2002. The spring 2024 is compressed and exerts a downward force on the vertical portion of the terminal 2022.

Figure 22:
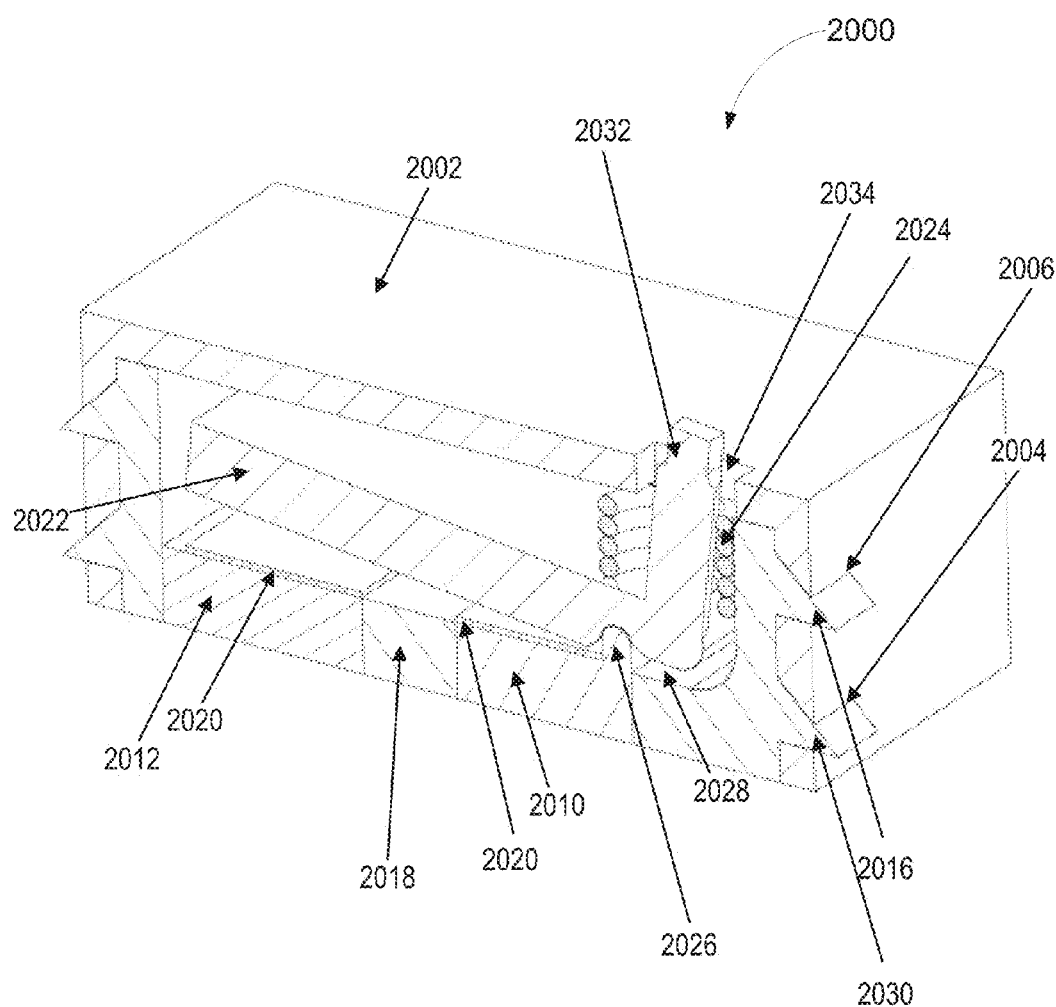
FIG. 22 shows a cross sectional view of the reflowable circuit protection device shown in FIG. 20 in an over-temperature condition.

FIG. 22 shows a cross sectional view of the reflowable circuit protection device 2000 shown in FIG. 20 in an over-temperature condition. When the device 2000 heats to above a melting point of the solder paste 2020, the paste melts and the horizontal portion of the terminal 2022 no longer adheres to the paste 2020. Accordingly, the spring 2024 decompresses and presses the vertical portion of the terminal 2022 down towards the space 2028, the terminal teeters or tilts over the protrusion 2026, causing the horizontal portion of the terminal 2022 to lift up as the vertical portion is pressed down. As the terminal tilts, the top 2032 of the vertical portion of the terminal 2022 tilts to the side within the hole 2034. When the horizontal portion of the terminal 2022 lifts up, the electrical connection between the electrodes 2010 and 2012 is severed and the device is turned off. In the embodiment of FIGS. 20-22, at least the cap with spring and cantilever terminal may correspond to a means for activating the device in response to a force applied to the cap.

Figure 23:
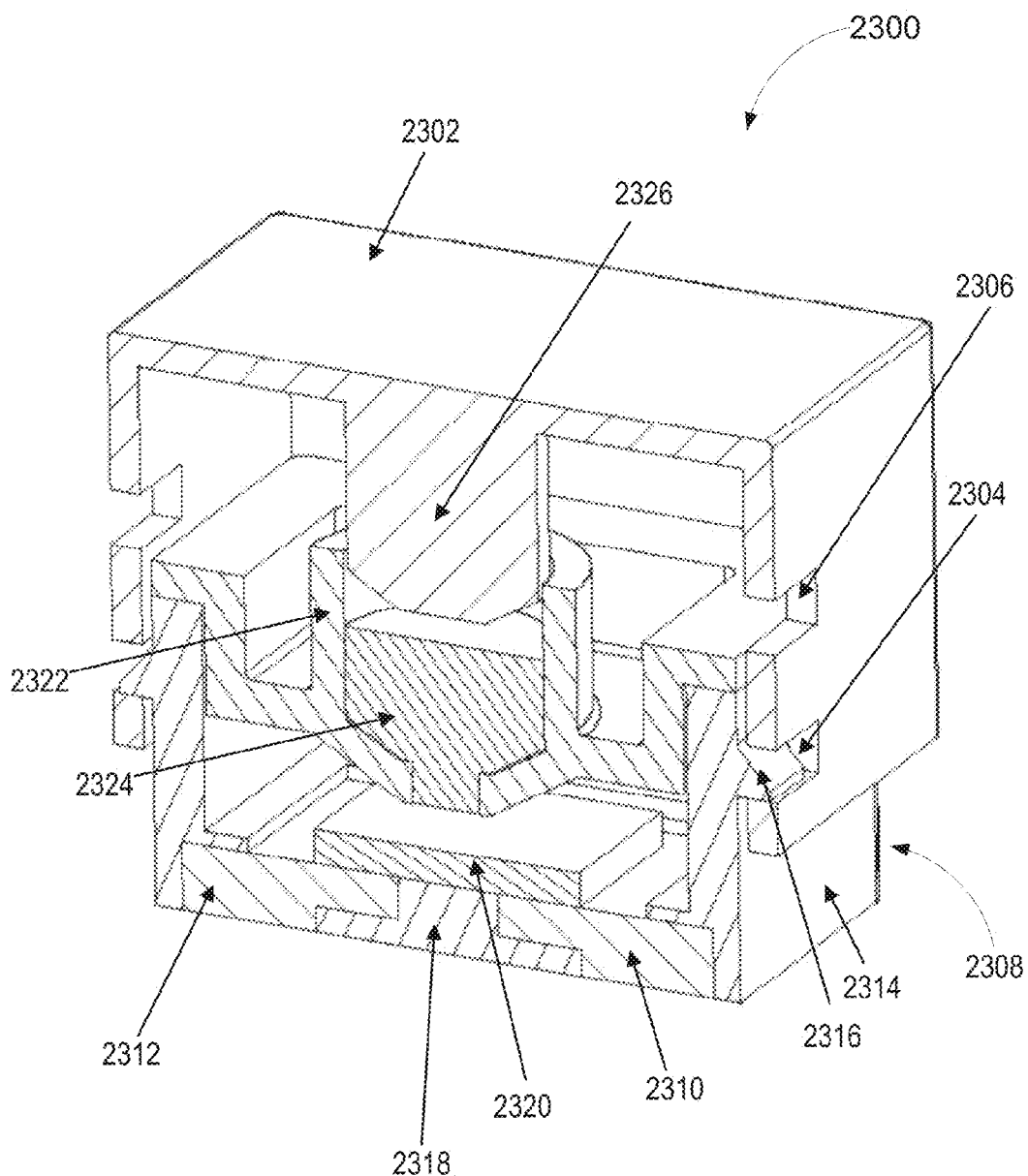
FIG. 23 shows a cross sectional view of another example of a reflowable circuit protection device.

FIG. 23 shows a cross sectional view of another example of a reflowable circuit protection device 2300. The device 2302 includes a cap 2302 with retention holes 2304 and 2306 defined through the side of the cap 2302. The cap 2302 may include retention holes 2304 and 2306 on one side of the cap, or on two opposing sides of the cap 2302.

Figure 24:
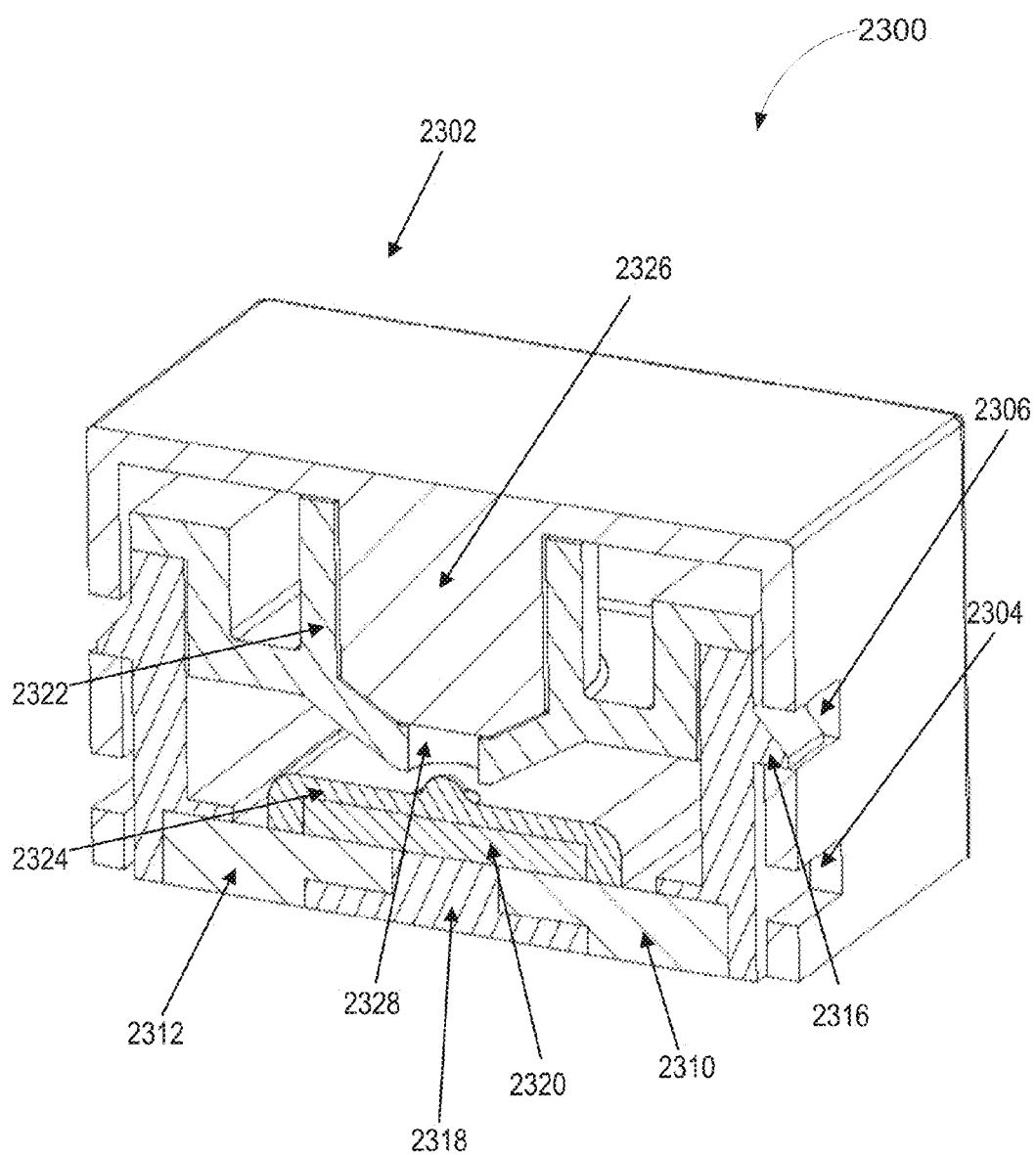
FIG. 24 shows a cross sectional view of the reflowable circuit protection device shown in FIG. 23 with the cap locked into the activation position.

The device 2300 includes a base assembly 2308 including electrodes 2310 and 2312, and a non-conductive, e.g., plastic, outer walls 2314. The base assembly 2008 includes a retention tab 2316 that is shaped to fit into either of the retention holes 2304 and 2306 to hold the cap 2302 in one of two positions relative to the base assembly 2308. When the retention tab 2016 is fit into the retention hole 2304, as shown in FIG. 23, the cap 2302 is in a pre-reflow position. When the retention tab 2316 is fit into the retention hole 2306, the cap 2302 is in an activation position. FIG. 24 shows the reflowable circuit protection device 2300 shown in FIG. 23 with the cap 2302 locked into the activation position, i.e., retention tab 2316 fit into the retention hole 2006. The base assembly 2308 also includes a dielectric 2318 between electrodes 2010 and 2012. A solder pre-form 2320 is formed above one or more of the electrodes 2310 and 2312. An oxide coating is applied to the solder pre-form 2320 as described above with respect to the circuit protection device shown in FIGS. 1-4. The oxide coating prevents the solder pre-form 2320 from pulling towards the electrodes during reflow, which is at a temperature greater than the melting point of the solder pre-form.

The device 2300 includes a flux reservoir 2322 that holds flux 2324 above the solder pre-form 2320 during reflow. The cap 2302 includes a protrusion 2326 extending down from the top of the cap 2302 into the flux reservoir 2322. When the device is in the pre-reflow position the protrusion 2326 does not extend into the flux 2324 itself.

FIG. 24 shows a cross sectional view of the reflowable circuit protection device 2300 shown in FIG. 23 with the cap 2302 locked into the activation position. After the device 2300 is subject to reflow and installed onto a circuit board or other circuit device to be protected, a downward force is applied to the top of the cap 2302 to move the cap 2302 into the activation position, i.e., retention tab 2316 inserted into retention hole 2306. This causes the protrusion 2326 to press into the flux material 2324 and force the flux material from the reservoir 2322 onto the solder pre-form 2320 through a hole 2328 defined at the bottom of the reservoir 2322. The diameter of the hole 2328 may be such to allow the surface tension of the flux 2324 to retain the flux 2324 in the reservoir 2322 during reflow. For example, the diameter of hole 2328 may be between approximate 0.1 mm to 1.0 mm. The diameter of the hole 2328 may vary depending on the viscosity of the type of flux material being used. In other embodiments, a thickening agent may be blended with the flux 2324 to help retain the flux 2324 in the reservoir 2322 during reflow. The flux 2324 dissolves the oxide coating such that when the device heats up after reflow to a temperature that is above the melting point of the solder pre-form 2320, the molten metal is allowed to separate and cut off the electrical connection between the electrodes 2310 and 2312, allowing the device to properly detect an over-temperature condition and turn off. In the embodiment of FIGS. 23-24, at least the cap with protrusion, reservoir, and flux may correspond to a means for activating the device in response to a force applied to the cap.

Figure 25:
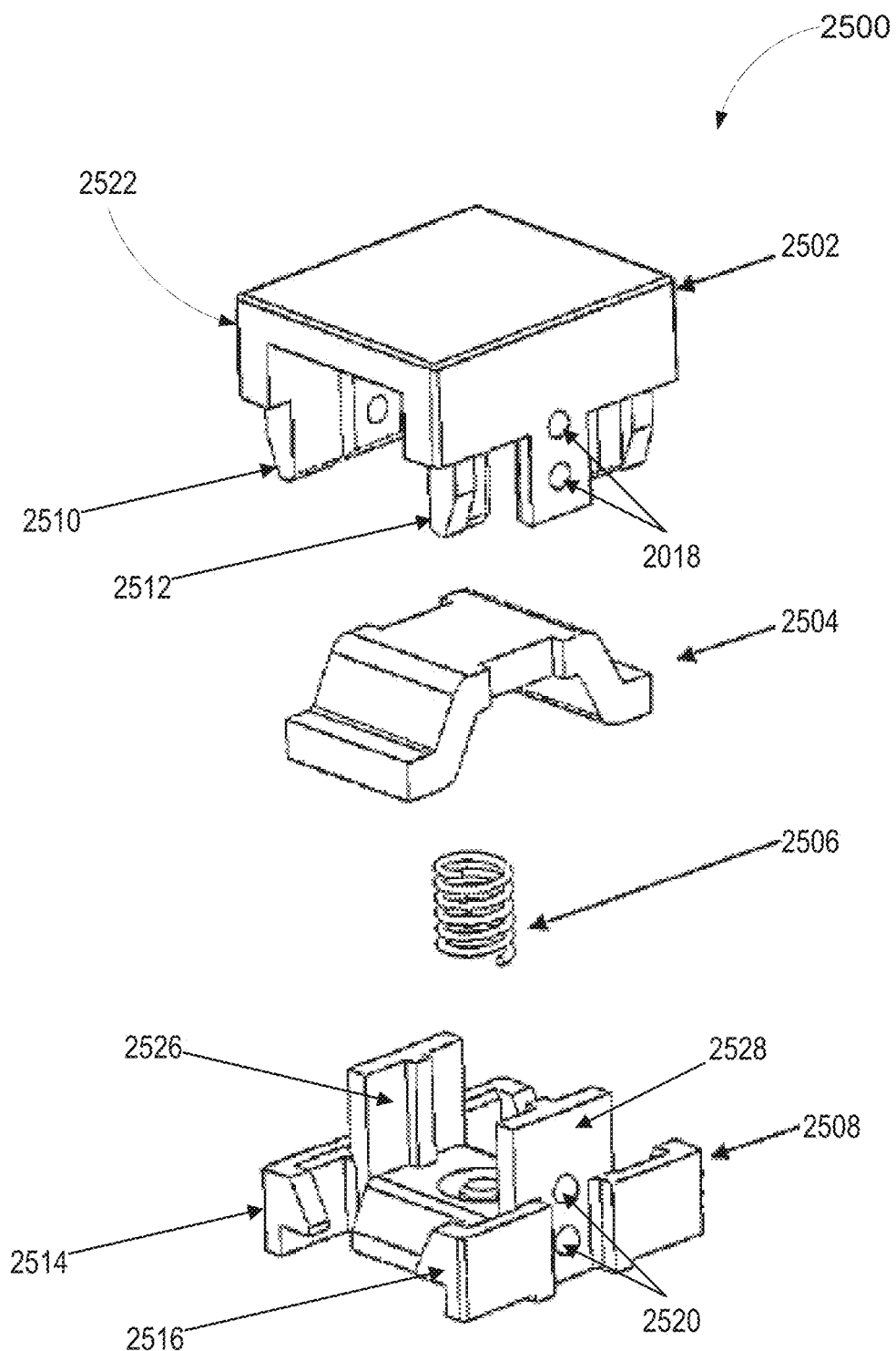
FIG. 25 shows an exploded view of the front of another example of a reflowable circuit protection device.
Figure 26:
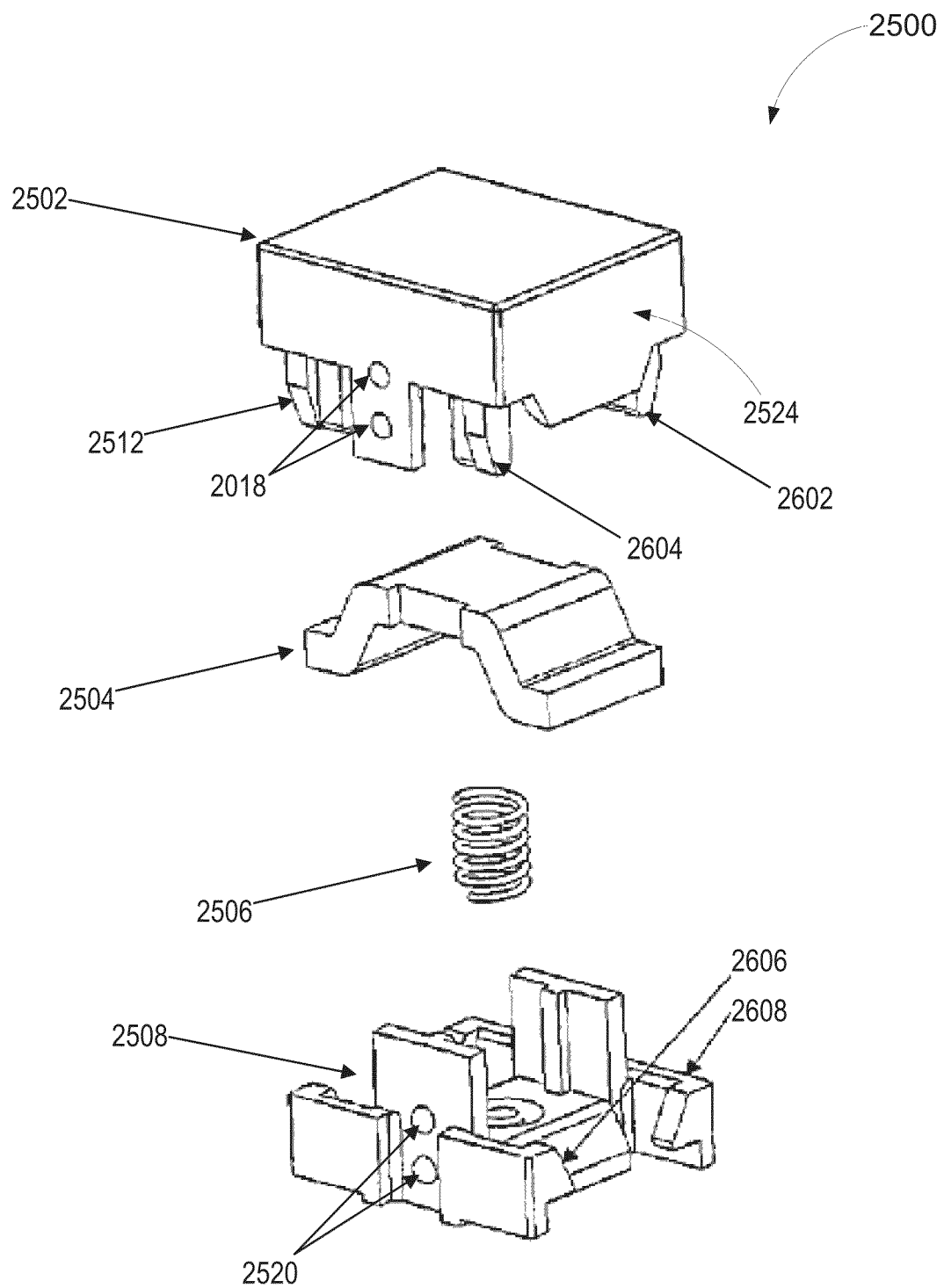
FIG. 26 shows an exploded view of the back of the reflowable circuit protection device shown in FIG. 25.
Figure 27:
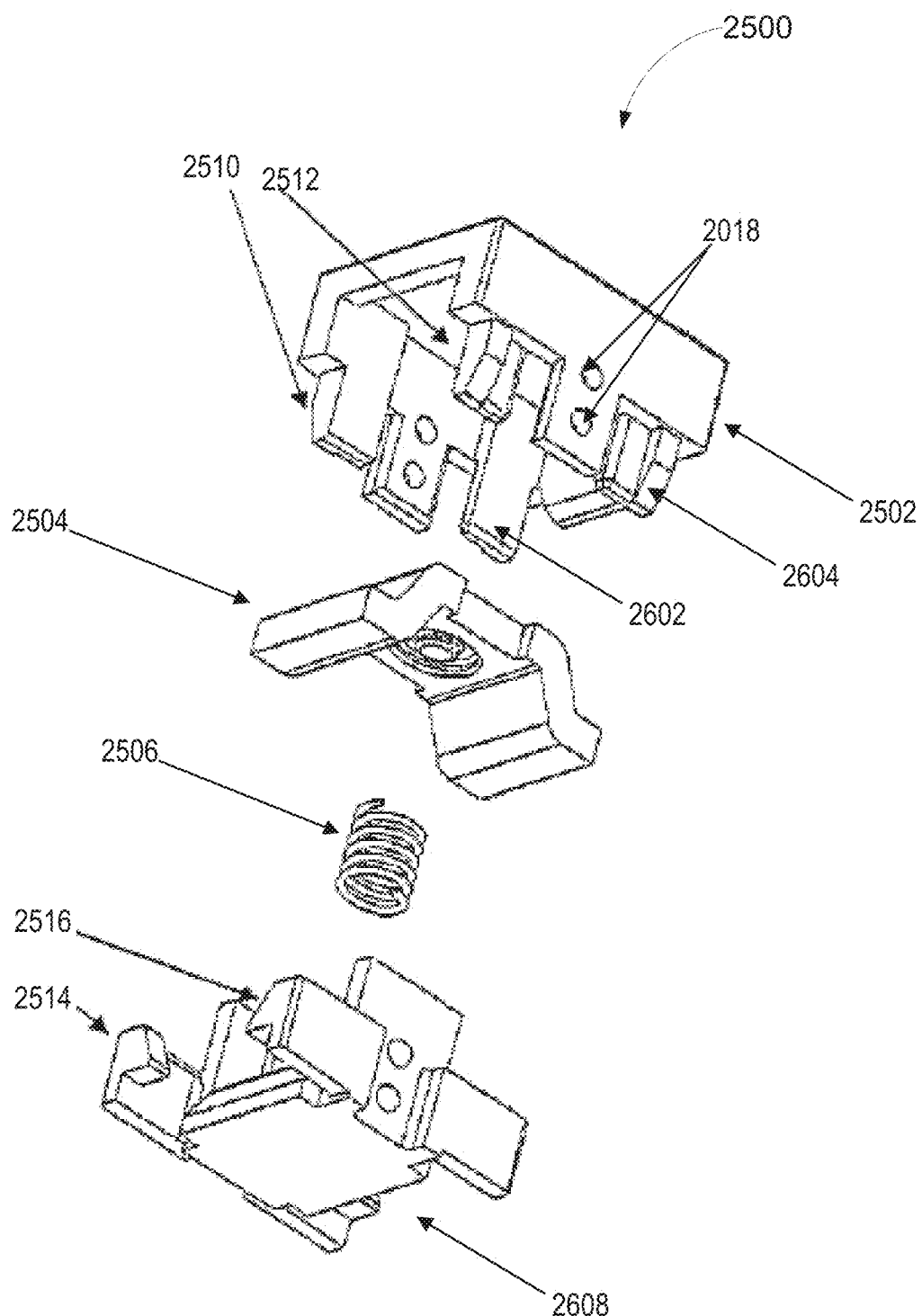
FIG. 27 shows an exploded view the underside of the reflowable circuit protection device shown in FIG. 25.

FIGS. 25-27 show exploded views another example of a reflowable circuit protection device 2500. The device 2500 includes an injection molded cap 2502, a metal terminal 2504, a compression spring 2506, and an injection molded base 2508. The terminal 2504 may be a plated copper terminal. The compression spring 2506 may be a stainless steel compression spring. The cap 2502 includes wedge-shaped protrusions 2510 and 2512 extending downward from the cap. The base 2508 includes latches 2514 and 2516. When a downward force is applied to the cap, the wedge-shaped protrusions 2510 and 2512 are pressed towards the latches 2514 and 2516, and force open the latches (i.e., presses the latches outward in a lateral direction perpendicular to the direction of the downward force on the cap) to release the terminal when the cap 2502 is depressed.

The cap 2502 includes a vertical strip of holes 2518 defined in the sides of the cap 2502. Corresponding bumps 2520 are included in the sides 2526 and 2528 of the base 2508. In particular the device 2500 includes two holes 2518 in each side 2526 and 2528 of the cap 2502 and two corresponding bumps 2520 in each side of the base 2508. Prior to installation, the top bump of the base 2508 fits into the lower hole of the cap 2502, which holds the cap 2502 in an "up" position. After installation, the cap 2502 is depressed, and the two bumps in the base 2508 fit into the two holes of the cap 2502, which holds the cap 2502 in a "down" position. In an alternative embodiment, the arrangement of holes and bumps can be reversed or modified, e.g. bumps may be included in the cap and the corresponding holes or recesses may be present in the base, or some combination thereof. In these alternatives, however, the function of such features remains that one set of holes and bumps keeps the cap in an "up" position prior to installation with the other set holds the cap in the "down" position after installation.

FIGS. 25-27 also show that a front side 2522 of the cap 2502 is open while a back side 2524 of the cap 2502 is closed. FIG. 26 also shows that the cap 2502 includes additional wedge-shaped protrusions 2602 and 2604 at the back side 2524 of the cap 2502, and that the base 2508 includes latches 2606 and 2608 at the back side of the base (opposite side from the side at which the latches 2514 and 2516 are located). As discussed above, when the cap 2502 is depressed the protrusions 2602 and 2604 force the latches 2606 and 2608 out in the lateral direction described above. At least the cap 2502, protrusions 2510 and 2512, and latches 2514 and 2516 may be a means for activating the device in response to a force applied to the cap. The bumps 2520 and holes 2518 may also be part of the means for activating the device in response to a force applied to the cap.

Figure 28:
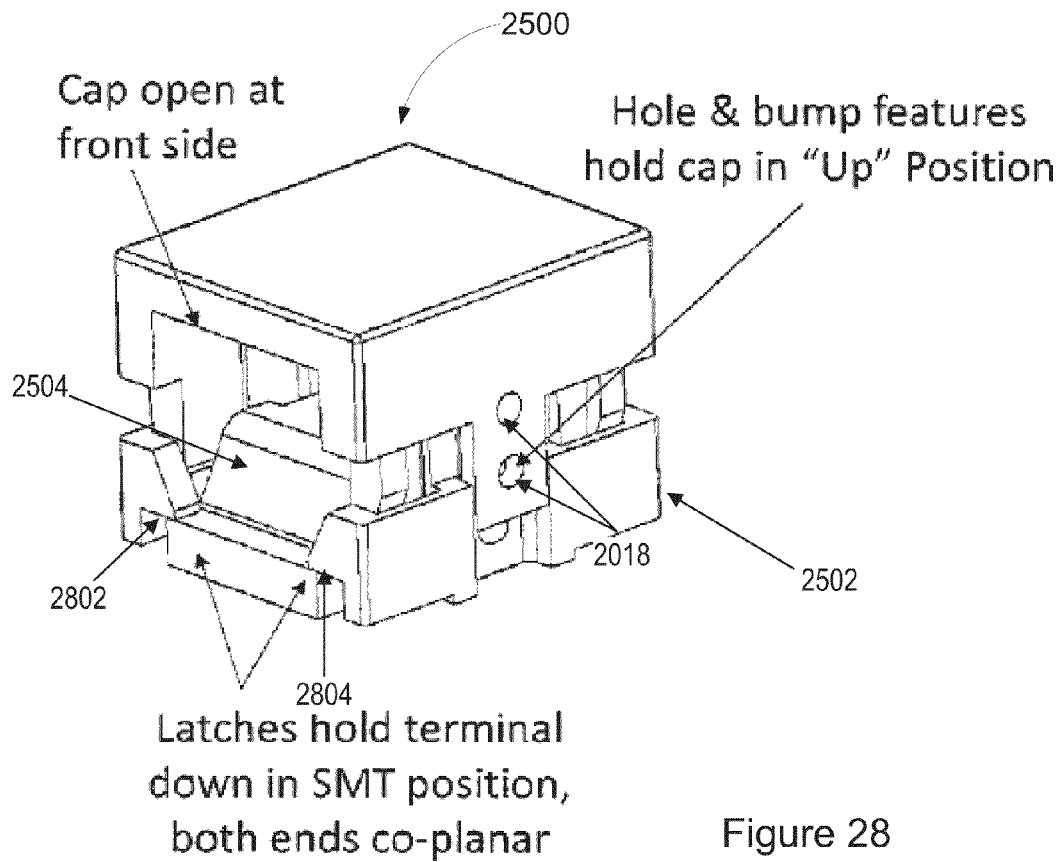
FIGS. 28-31 show the circuit protection device shown in FIG. 25 prior to installation.
Figure 29:
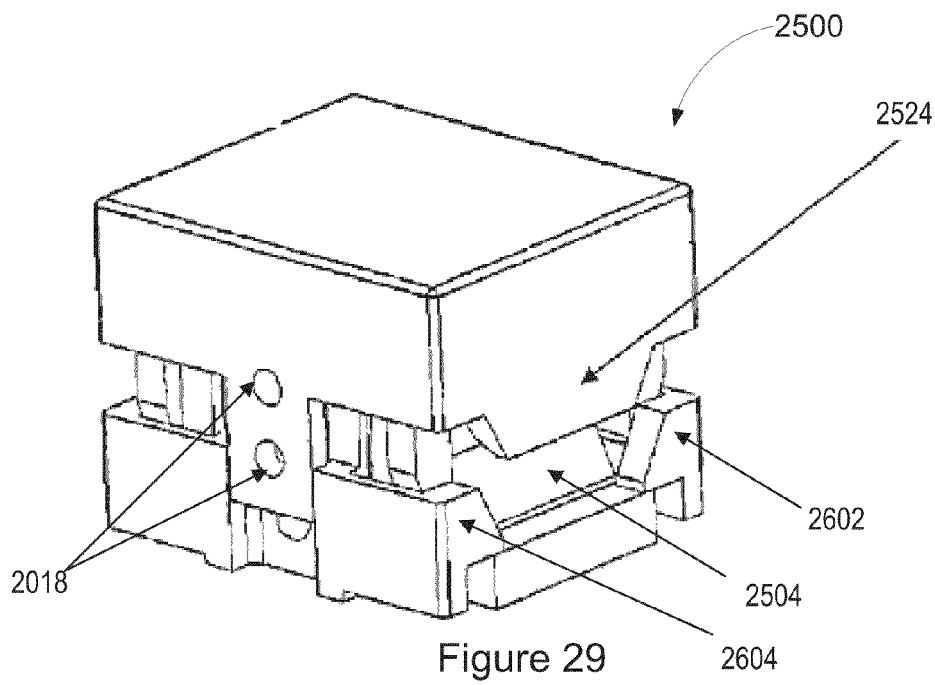

FIGS. 28-31 show the device 2500 prior to installation, i.e., with the cap 2502 in the "up" position. FIG. 28 in particular shows that the latches 2514 and 2516 include cantilevered portions 2802 that extend over a portion of the terminal 2504, which holds the terminal 2504 down in SMT position. The latches 2514 and 2516 hold the terminal 2504 down, which holds the spring 2506 in a compressed state under the terminal 2504.

Figure 30:
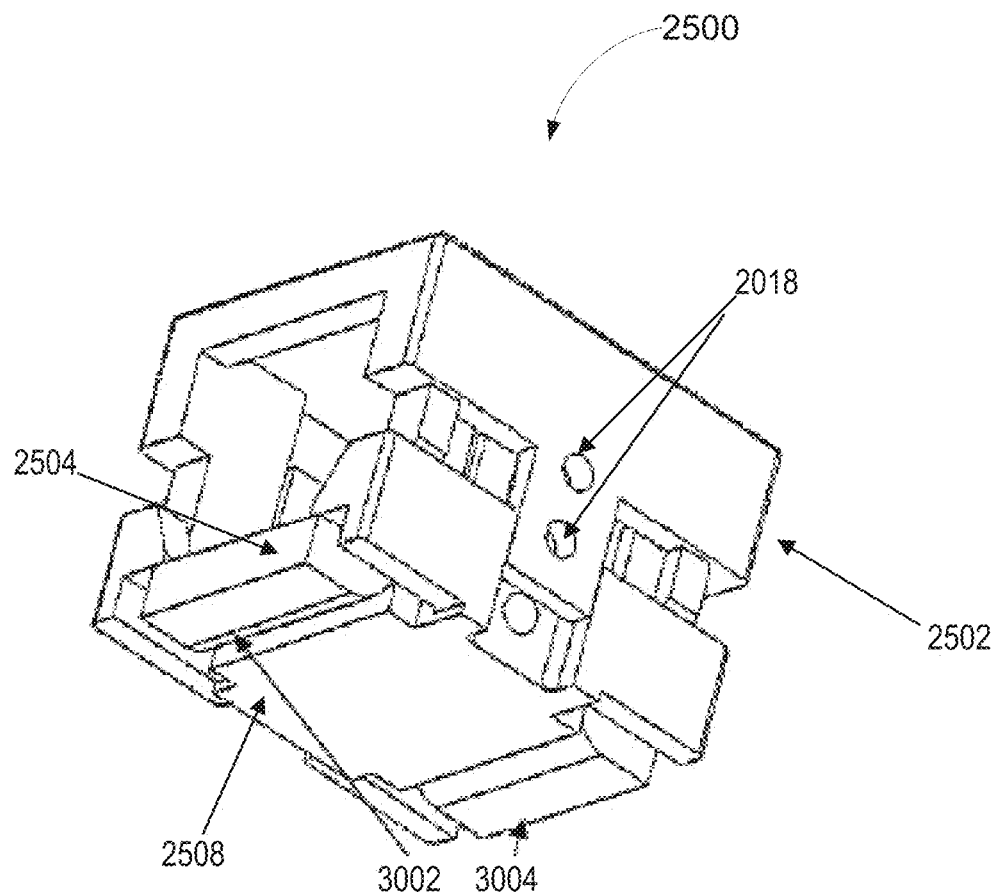
Figure 31:
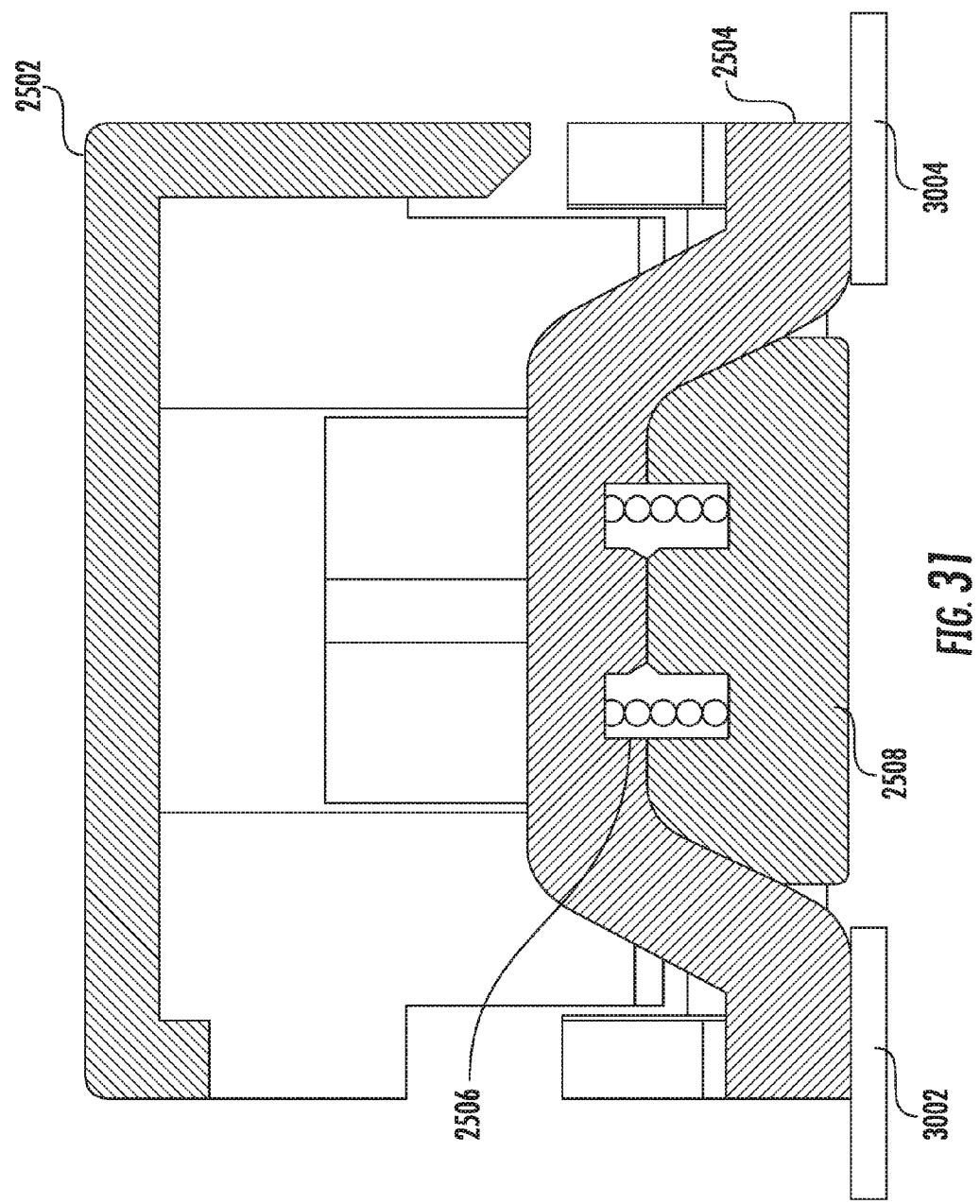

FIG. 30 shows an underside view of the device 2500, showing solderable SMT pads 3002 and 3004 of the terminal 2504. The device 2500 may be soldered to a circuit, e.g., to PCB pads, with the cap 2502 in the "up" position. FIG. 31 shows a cross-sectional view of the device 2500 with the cap in the "up" position.

Figure 32:
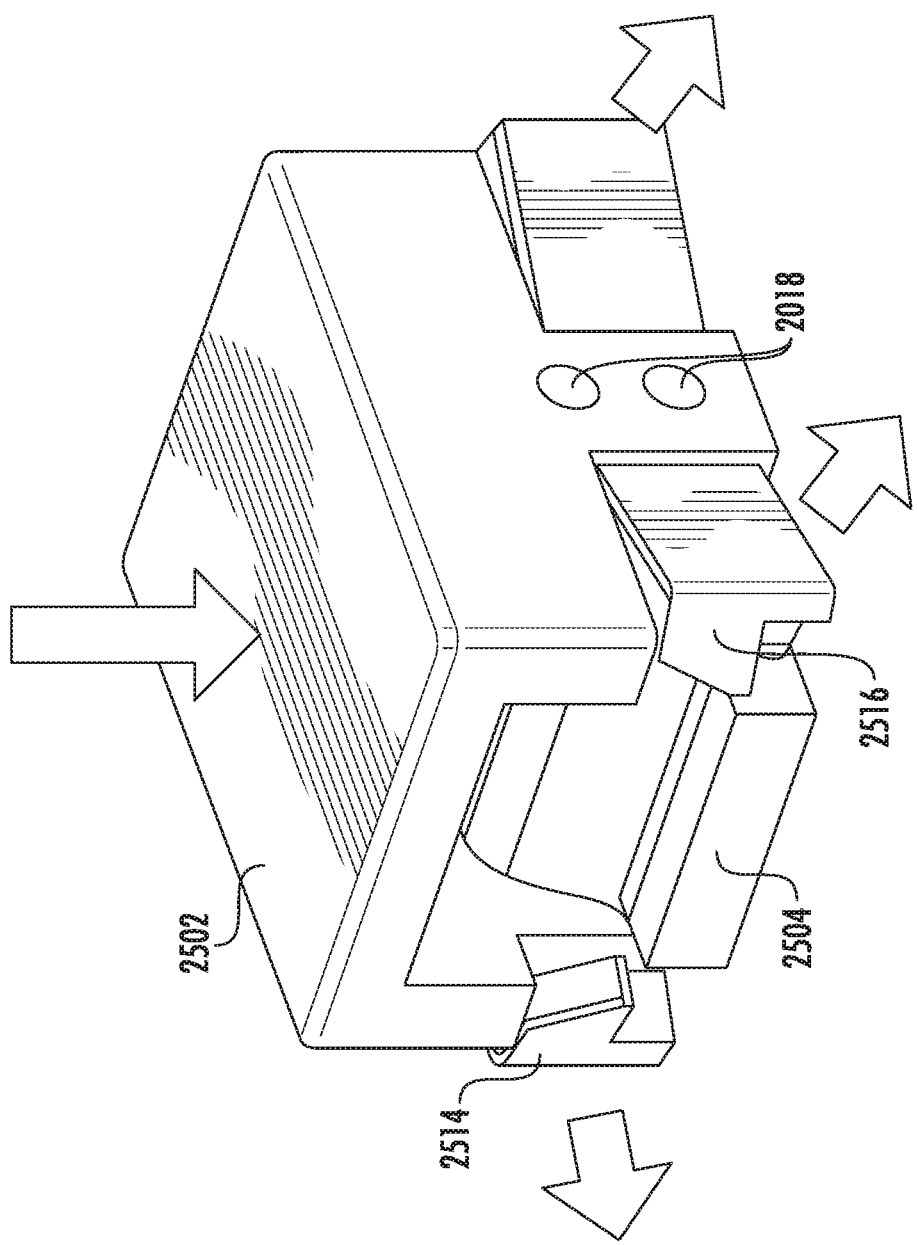

FIGS. 32-34 show the device 2500 after being armed, in which the cap 2502 is in the "down" position. The device 2500 is armed after installation into the circuit to be protected. As illustrated in FIG. 32, the device 2500 is armed by exerting a downward force on the cap 2502. The wedge protrusions 2510 and 2512 force the latches 2514 and 2516 to move laterally relative to the downward force applied to the cap 2502, such that the cantilevered portions 2802 of the latches 2514 and 2516 are no longer over a portion of the terminal 2504. In other words, when the device 2500 is armed, the latches 2514 and 2516 no longer hold the terminal 2504 down. Instead, the soldered pads 3002 and 3004 hold the terminal down and resist the decompression force of the spring 2506.

In addition, as illustrated in FIG. 33, the holes 2518 of the cap 2502 are aligned with the bumps 2520 of the base 2508 when the device 2500 is armed. FIG. 34 shows an underside view of the device 2500, which further illustrates that the latches 2604 and 2516 have been moved away from the terminal ends in a lateral direction.

Figure 35:
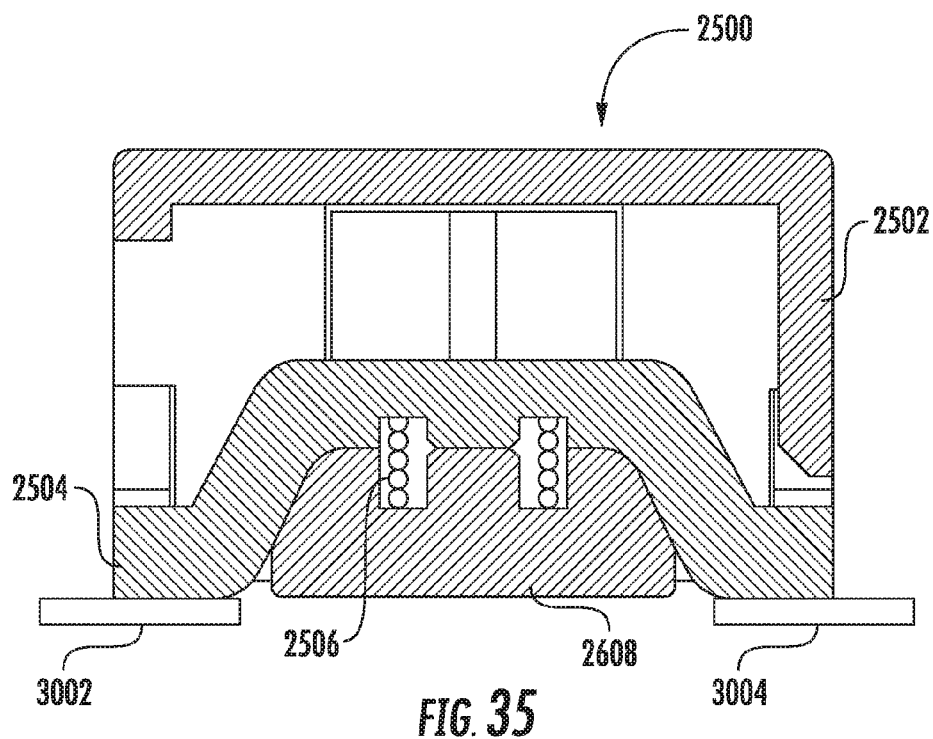
FIG. 35 shows a cross-sectional view of the circuit protection device shown in FIG. 25 when the device is armed.

FIG. 35 shows a cross-sectional view of the device 2500 when the device is armed. In the armed state, the spring 2506 is compressed between the terminal 2504 and the base 2508. The solder pads 3002 and 3004 hold the terminal 2404 down and resist the upward force of the compressed spring 2506.

Figure 36:
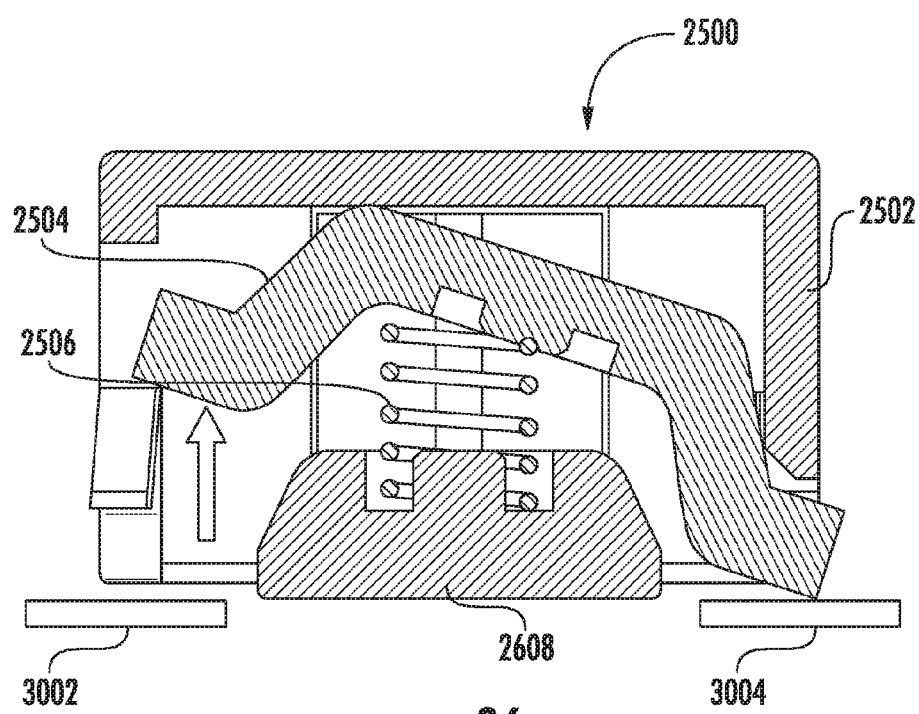
FIG. 36 shows the circuit protection device shown in FIG. 25 after an over-temperature condition.

FIG. 36 shows the device 2500 after an over-temperature condition. When the solder 3002 melts during high temperature conditions, the solder's resistance to the upward force of the compressed spring is lessened and the compressed spring 2506 forces at least one side of the terminal 2504 upwards. The conductive path between SMT pads 3002 and 3004 is therefore severed, thereby turning off the device. The side of the terminal 2405 that lifts during an over-temperature condition may be the side that is furthest to the heat source. For the device to function properly, the solder on both sides should be melted, with one side acting as a hinge, and the other being the disconnecting point. Since the side of the terminal 2405 closest to the heat source is restricted from disconnecting, the circuit will continue to carry current and heat the device until the solder on both sides has melted.

Figure 37:
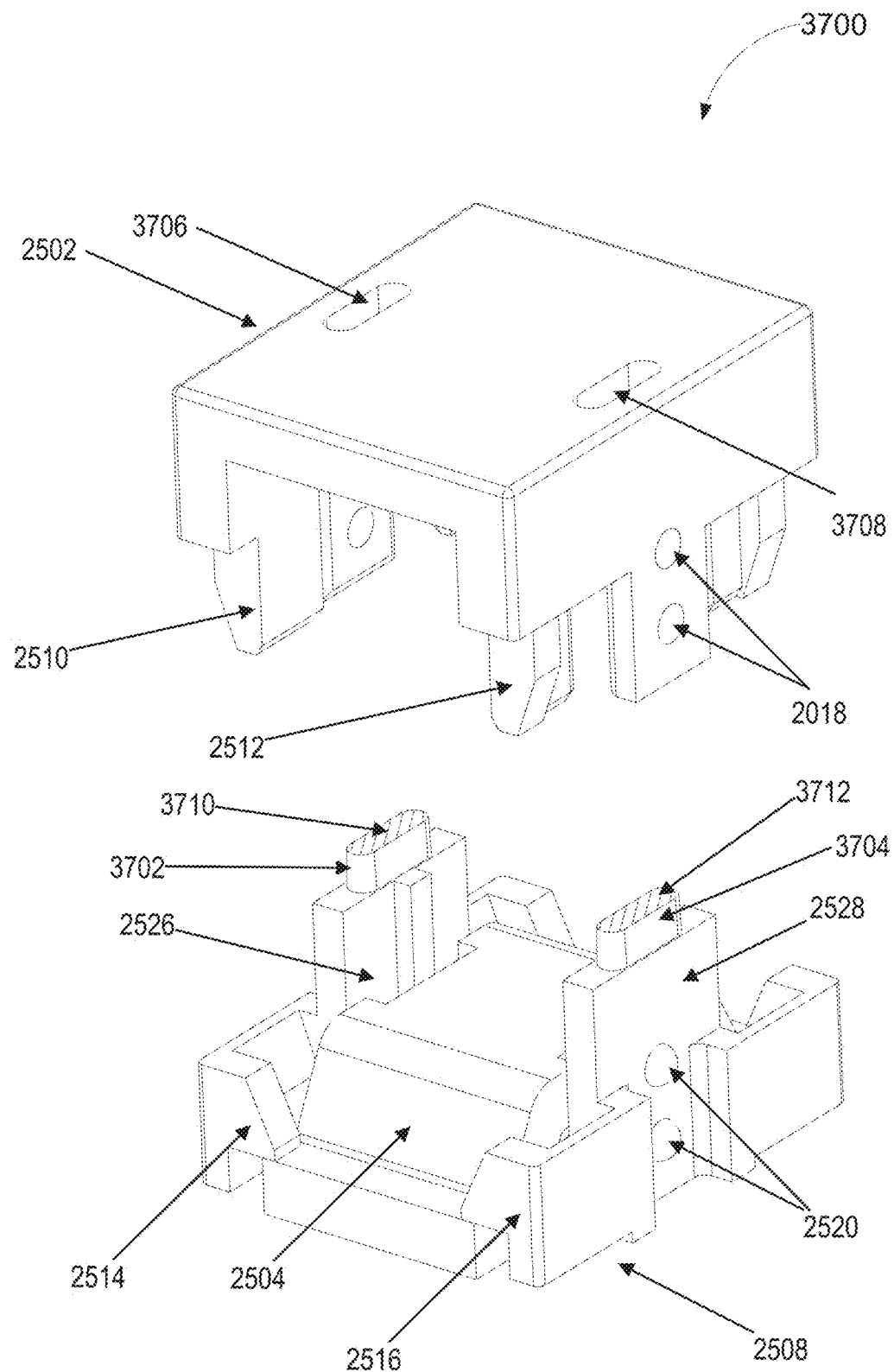
FIG. 37 shows another example of a reflowable circuit protection device.
Figure 38:
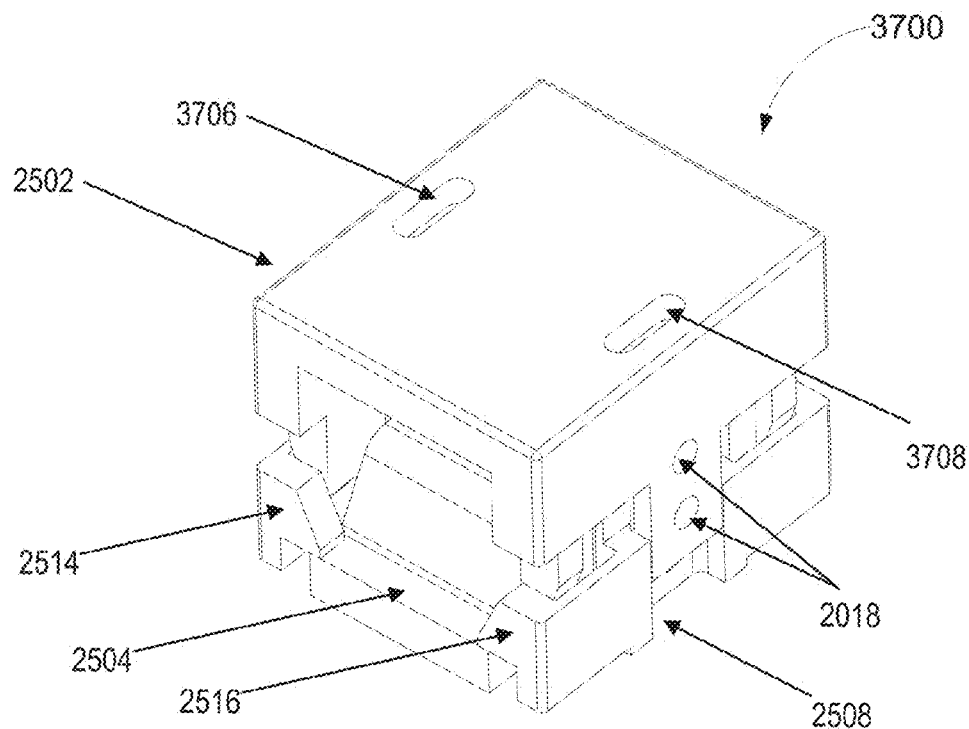
FIG. 38 shows the circuit protection device shown in FIG. 37 prior to installation.
Figure 39:
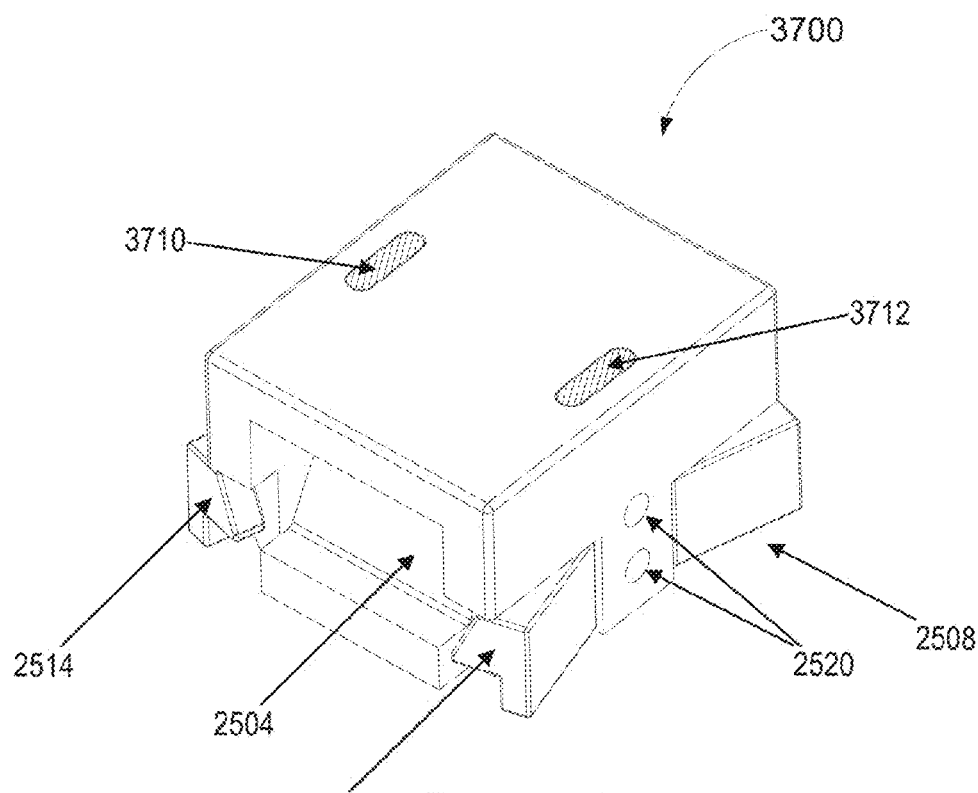
FIG. 39 shows the circuit protection device shown in FIG. 37 after being installed and armed.

FIGS. 37-39 show another example of a reflowable circuit protection device 3700. Referring to FIG. 37, the device 3700 is similar to the device 2500 illustrated in FIGS. 25-36, except that standing posts 3702 and 3704 extend upward from the top of the sides 2526 and 2528 of the base 2508, and the injection molded cap 2502 includes holes 3706 and 3708 defined in the top of the cap 2502. The holes 3706 and 3708 are shaped to match the shape of the posts 3702 and 3704 such that when the device 3700 is armed, the posts 3702 and 3704 are inserted into the holes 3706 and 3708, respectively. When the device 3700 is armed, the top surfaces 3710 and 3712 of the posts 3702 and 3704 may be substantially co-planar with the top surface of the cap 2502, or extend above the top surface of the cap 2502, to provide a visual indicator that the device 3700 is armed.

FIG. 38 shows the device 3700 before arming, with the cap 2502 in the "up" position. FIG. 39 shows the device 3700 after installation and arming, with the cap 2502 in the "down" position. The top surfaces 3710 and 3712 of the posts 3702 and 3704 may be a different color than the cap 2502 such that when the device 3700 is armed the top surfaces 3710 and 3712 of the posts 3702 and 3704 are visible from a top view of the device 3700. The top surfaces 3710 and 3712 may be pad-printed with a color that contrasts with the color of the cap 2502. Alternatively, the entire base 2508 and cap 2502 may be molded with different colors; for example, the cap 2502 could be white or red while the base 2508 is black.

While the circuit protection device has been described with reference to certain embodiments, it will be understood by those skilled in the art that various changes may be made and equivalents may be substituted without departing from the scope of the claims of the application. In addition, many modifications may be made to adapt a particular situation or material to the teachings without departing from its scope. Therefore, it is intended that the reflowable circuit protection device is not to be limited to the particular embodiments disclosed, but to any embodiments that fall within the scope of the claims.

We claim:

1. A circuit protection device comprising: a base comprising:
   a first latch on a front side of the base; and
   a second latch on the front side of the base; a spring on top of the base;
   a conductive terminal that fits over the base, the conductive terminal comprising a first end on the front side of the base and a second end on a rear side of the base that is opposite to the front side, wherein the first and second latches each comprise a portion that rests on top of a portion of the first end of the conductive terminal;
   a cap covering the base, conductive terminal and spring, the cap comprising:
     a first protrusion extending downward from the cap above the first latch; and
     a second protrusion extending downward from the cap above the second latch; and
   a means for activating the circuit protection device after reflow in response to a force applied to the cap in a first direction defined from a top of the cap towards the base.

2. The circuit protection device of claim 1, wherein
   the base further comprises a first sidewall comprising a first protrusion and a second protrusion below the first protrusion,
   the cap further comprising a first hole defined in a side of the cap and a second hole defined in the side of the cap below the first hole, and
   the first and second protrusions and first and second holes are positioned such that the first protrusion is aligned with the second hole prior to activating the circuit protection device, and after activating the circuit protection device the first protrusion is aligned with the first hole and the second protrusion is aligned with the second hole.

3. The circuit protection device of claim 1, wherein the first and second protrusions are positioned relative to the first and second latches, respectively, such that when the force is applied to the cap in the first direction, the first and second protrusions cause the first and second latches, respectively, to move in a lateral direction that is perpendicular to the first direction.

4. The circuit protection device of claim 1, wherein
   the base further comprises a first sidewall comprising a post extending upwards from a top of the first sidewall, and
   the cap comprises a hole defined in a top surface of the cap at a location in the cap that is vertically aligned in the first direction with the post.

5. The circuit protection device of claim 4, wherein the hole is defined to receive the post when the force is applied to the cap in the first direction.

6. The circuit protection device of claim 4, wherein a top surface of the post comprises a printed color that is different than a color of the cap.

7. A circuit protection device comprising:
   a base assembly comprising:
     a first electrode;
     a second electrode;
     a dielectric separating the first and second electrodes; and
     a metal layer formed on at least a portion of an upper surface of each of the first electrode and second electrode such that the metal layer forms a conductive bridge between the first and second electrodes, wherein the metal layer has a melting point that is less than a reflow temperature;
   a cap covering the base assembly; and
   a means for activating the circuit protection device after reflow in response to a force applied to the cap in a first direction defined from a top of the cap towards the base assembly.

8. The circuit protection device of claim 7, wherein the metal layer comprises a solder link.

9. The circuit protection device of claim 7, wherein the metal layer comprises a coating that prevents the metal layer from pulling apart when the metal layer melts.

10. The circuit protection device of claim 9, wherein the coating is an oxide coating.

11. The circuit protection device of claim 9, wherein the means for activating the circuit protection device comprises a flux material inside the cap and above the metal layer, and wherein the flux comprises a material that dissolves the coating when the flux melts.

12. The circuit protection device of claim 7, wherein the means for activating the circuit protection device comprises a flux material inside the cap and above the metal layer.

13. The circuit protection device of claim 7, wherein the means for activating the circuit protection device comprises:
   a plate extending from an inner side of the cap to an opposing inner side of the cap;
   a gap defined between an upper surface of the plate and a lower surface of a top of the cap;
   a knife rib extending from a bottom surface of the plate towards the base assembly; and
   a spring positioned within the gap.

14. The circuit protection device of claim 7, wherein the means for activating the circuit protection device comprises spring that is loaded in response to the force applied to the cap.

15. A method of manufacturing a circuit protection device, comprising:
   providing a first electrode, a second electrode, and a dielectric interposed between the first and second electrodes;
   providing a metal layer on at least a portion of an upper surface of each of the first electrode and second electrode such that the metal layer forms a conductive bridge between the first and second electrodes;
   forming a coating over the metal layer, wherein the coating comprises a material that prevents the metal layer from pulling apart when the metal layer melts;
   subjecting a structure comprising the first electrode, second electrode, dielectric, metal layer and coating to a reflow process in a reflow oven, wherein a melting point of the metal layer is less than a temperature of the reflow process; and
   applying a flux over the metal layer after the reflow process.

16. The method of claim 15, wherein applying a coating over the metal layer comprising oxidizing the metal layer to form an oxide coating on the metal layer.

17. The method of claim 15, wherein applying the flux comprises installing a cap with flux provided inside of the cap over the structure comprising the first electrode, second electrode, dielectric, metal layer, and coating.

18. The method of claim 15, wherein providing the metal layer comprises:
   applying a solder paste over the dielectric, first electrode, and second electrode, wherein the solder paste has a melting point that is less than the melting point of the metal layer;
   applying the metal layer over the solder paste; and
   heating a structure comprising the first electrode, second electrode, dielectric, solder paste, and metal layer to a temperature that is above the melting point of the solder paste but below the melting point of the metal layer to form a bond between the solder paste and the metal layer.

19. The method of claim 15, wherein the flux comprises a material that dissolves the coating when the flux melts.

20. The method of claim 15, wherein applying the flux comprises applying a downward force to a top of a cap provided over the structure comprising the first electrode, second electrode, dielectric, metal layer, and coating.

21. A circuit protection device comprising:
   a base assembly comprising:
      a first electrode;
      a second electrode;
      a dielectric separating the first and second electrodes; and
      a metal layer formed on at least a portion of an upper surface of each of the first electrode and second electrode such that the metal layer forms a conductive bridge between the first and second electrodes, wherein the metal layer is held in place above the first and second electrodes by a metal having a melting point that is less than a reflow temperature;
   a cap covering the base assembly; and
   a means for activating the circuit protection device after reflow in response to a force applied to the cap in a first direction defined from a top of the cap towards the base assembly.

22. The circuit protection device of claim 21, wherein the base assembly further comprises:
   a bridging terminal positioned above the metal layer, the bridging terminal comprising a cantilevered end; and
   a spring comprising a first end under the cantilevered end and a second end;
   wherein the means for activating the circuit protection device comprises a rib extending from an inside surface of the cap that, in response to the force applied to the cap, exerts a force on the second end of the spring in the first direction.

23. The circuit protection device of claim 22, wherein the base assembly comprises a side wall that has a retention tab, and the cap comprises a first retention hole defined in a side of the cap and shaped to receive the retention tab and a second retention hole defined in the side of the cap below the first retention hole and shaped to receive the retention tab.

24. The circuit protection device of claim 23, wherein the first and second retention holes are positioned in the side of the cap such that the force applied in the first direction causes the retention tab to be inserted into the first retention hole.

* * * * *